(12) United States Patent
Li et al.

(10) Patent No.: US 9,134,169 B2
(45) Date of Patent: Sep. 15, 2015

(54) IN-MICRORESONATOR LINEAR-ABSORPTION-BASED REAL-TIME PHOTOCURRENT-MONITORING AND TUNING WITH CLOSED-LOOP CONTROL FOR SILICON MICRORESONATORS

(71) Applicant: The Hong Kong University of Science and Technology, Hong Kong (CN)

(72) Inventors: Yu Li, Hong Kong (CN); Shaoqi Feng, Hong Kong (CN); Yu Zhang, Hong Kong (CN); Andrew Wing On Poon, Hong Kong (CN)

(73) Assignee: The Hong Kong University of Science and Technology, Kowloon (HK)

(*) Notice: Subject to any disclaimer, the term of this patent is extended or adjusted under 35 U.S.C. 154(b) by 204 days.

(21) Appl. No.: 14/057,679

(22) Filed: Oct. 18, 2013

(65) Prior Publication Data

US 2014/0110572 A1    Apr. 24, 2014

Related U.S. Application Data

(60) Provisional application No. 61/795,537, filed on Oct. 19, 2012.

(51) Int. Cl.
| | | |
|---|---|---|
| *G01J 1/02* | (2006.01) | |
| *G01J 1/04* | (2006.01) | |
| *G01J 1/44* | (2006.01) | |
| *G02B 6/12* | (2006.01) | |
| *G02B 6/293* | (2006.01) | |

(52) U.S. Cl.
CPC .............. *G01J 1/0209* (2013.01); *G01J 1/0425* (2013.01); *G01J 2001/446* (2013.01); *G02B 6/12007* (2013.01); *G02B 6/29341* (2013.01)

(58) Field of Classification Search
CPC . G01J 1/0209; G01J 1/0425; G01J 2001/446; G02B 6/12007; G02B 6/29341
See application file for complete search history.

(56) References Cited

U.S. PATENT DOCUMENTS

| | | | |
|---|---|---|---|
| 6,052,495 | A | 4/2000 | Little et al. |
| 6,661,950 | B1 * | 12/2003 | Strecker .................... 385/30 |
| 6,888,854 | B2 | 5/2005 | Margalit |
| 6,985,644 | B2 | 1/2006 | Andersen et al. |

(Continued)

OTHER PUBLICATIONS

Baehr-Jones et al., "Photodetection in silicon beyond the band edge with surface states," *Optics Express*, vol. 16(3), 2008.

(Continued)

*Primary Examiner* — Francis M Legasse, Jr.
(74) *Attorney, Agent, or Firm* — Leydig, Voit & Mayer, Ltd.

(57) ABSTRACT

An integrated silicon optical device is capable of being monitored and tuned in real-time. The integrated silicon optical device includes: a bus waveguide, comprising an input port and an output port; an optical microresonator coupled to the bus waveguide, configured to selectively receive light at a desired resonance wavelength from the bus waveguide; a photodetector, configured to electrically read out an operation condition of the optical microresonator; a diode-tuner, configured to blueshift or redshift the resonance wavelength of the optical microresonator; a micro-heater, configured to redshift the resonance wavelength of the optical microresonator; and a control unit, comprising a transimpedance amplifier (TIA) and a microprocessor, configured to implement a two-stage closed-loop tuning scheme.

31 Claims, 22 Drawing Sheets

(56) References Cited

U.S. PATENT DOCUMENTS

| | | | |
|---|---|---|---|
| 7,356,221 | B2 | 4/2008 | Chu et al. |
| 7,639,723 | B2 | 12/2009 | Yamazaki |
| 7,688,872 | B2 | 3/2010 | Chen et al. |
| 8,124,927 | B2 | 2/2012 | Savchenkov et al. |
| 2004/0264834 | A1 | 12/2004 | McIntyre et al. |
| 2008/0001062 | A1* | 1/2008 | Gunn et al. ............... 250/206 |
| 2010/0166364 | A1 | 7/2010 | Abad et al. |

OTHER PUBLICATIONS

Bradley, et al., "Silicon waveguide-integrated optical power monitor with enhanced sensitivity at 1550nm," *App. Phys. L.*, 86, 241103, 2005.

Chen et al., "Cavity-enhanced photocurrent generation by 1.55µm wavelengths linear absorption in a p-i-n diode embedded silicon microring resonator," *Appl. Phys. L.*, 95, 17111, 2009.

Chen et al., "Two-photon absorption photocurrent in p-i-n diode embedded silicon microdisk resonators," *Appl. Phys., L.*, 96, 191106, 2010.

Dong et al., "Wavelength-tunable silicon microring modulator," *Optics Express*, vol. 18(11), 2010.

Fang et al, "High Efficiency Ring Resonator Filter with NiSi Heater," *IEEE Photonics Technology Letters*, 24(5), 350-352, 2012.

Geis et al., "CMOS-Compatible All-Si High-Speed Waveguide Photodiodes with High Responsivity in Near-Infrared Communication Band," *IEEE Photonics Tech. Lett.*, vol. 19(3), Feb. 2007.

Geis et al., "Silicon waveguide infrared photodiodes with >35 GHz bandwidth and phototransistors with 50 AW(−1) response," *Optics Express*, vol. 17(7), Mar. 2009.

Geis et al., "All silicon infrared photodiodes: photo response and effects of processing temperature," *Optics Express*, vol. 15(25), Dec. 2007.

Guha et al., "Athermal silicon microring electro-optic modulator," *Optics Letters*, vol. 37(12), Jun. 2012.

Knights et al., "Silicon-on-insulator waveguide photodetector with self-ion-implantation-engineered-enhanced infrared response," *J. Vac. Sci. Technol.* 24, 783, 2006.

Li et al, "25Gb/s 1V-driving CMOS ring modulator with integrated thermal tuning," *Optics Express*, vol. 19(21), Oct. 2011.

Liu et al., "In-Line Channel Power Monitor Based on Helium Ion Implantation in Silicon-on-Insulator Waveguides," *IEEE Photonics Technology Letters*, vol. 18(17) Sep. 2006.

Logan et al., "Monitoring and Tuning Micro-Ring Properties Using Defect-Enhanced Silicon Photodiodes at 1550 nm," *IEEE Photonics Technology Letters*, vol. 24(4), Feb. 2012.

Logan et al., "Analysis of resonance enhancement in defect-mediated silicon micro-ring photodiodes operating at 1550 nm," *J. of Optics A.*, 13, 2011.

Luo et al., "Silicon High-Order Coupled-Microring Based Electro-Optical Switches for On-Chip Optical Interconnects," *IEEE Photonics Technology Letters*, 24(1), 821, 823, May 2012.

Mao et al., "Selenium-Doped Silicon-on-Insulator Waveguide Photodetector with Enhanced Sensitivity at 1550 nm," *IEEE Photonics Technology Letters*, vol. 23(20), Oct. 2011.

Park et al., "All-silicon and in-line integration of variable optical attenuators and photodetectors based on submicrometer rib waveguides," *Optics Express*, vol. 18(15), Jul. 2010.

Preston et al., "Waveguide-integrated telecom-wavelength photodiode in deposited silicon," *Optics Letters*, vol. 36(1), Jan. 2011.

Soref et al., "Electrooptical effects in silicon," Quantum Electronics, *IEEE Journal*, 23, 123-129 (1987).

Zhou et al., "Silicon electro-optic modulators using pin diodes embedded 10-micron-diameter microdisk resonators," *Optics Express* 14, 6851-6857 (2006).

Dong et al., "Low Vpp, ultralow-energy, compact, high-speed silicon electro-optic modulator," *Optics Express* 17, 22484-22490 (2009).

Chen et al., "Low-loss multimode-interference-based crossings for silicon wire waveguides," *Photonics Technology Letters*, IEEE 18, 2260-2262 (2006).

Poon et al., "All-silicon and epitaxially grown III-Von-silicon photodetectors for on-chip optical interconnection applications", Photonics West 2013 conference, Feb. 2013.

Li et al., "Defect-state absorption photocurrent in PN-diode-integrated silicon microring resonators", Conference on Lasers and electro-optics, Jun. 2013.

Feng et al., "Silicon feedback-microring electro-optical switches with integrated surface-state-absorption linear photocurrent monitors", Conference on lasers and electro-optics, Jun. 2013.

Timurdogan et al. "Automated Wavelength Recovery for Microring Resonators," *CLEO Technical Digest*, 2012.

* cited by examiner

IN-MICRORESONATOR LINEAR-ABSORPTION-BASED REAL-TIME PHOTOCURRENT-MONITORING AND TUNING WITH CLOSED-LOOP CONTROL FOR SILICON MICRORESONATORS

CROSS-REFERENCE TO RELATED APPLICATIONS

This patent application claims the benefit of U.S. Provisional Patent Application No. 61/795,537, filed Oct. 19, 2012, which is incorporated by reference in its entirety.

FIELD

The present application relates to silicon photonics technology for next-generation wavelength-division multiplexing (WDM) optical communications and optical interconnections for computers and data centers, and specifically relates to real-time on-chip opto-electrical monitoring and active controlling of all-silicon microresonator-based devices using cavity-enhanced sub-bandgap linear-absorption-induced photocurrent detection.

BACKGROUND

The research and development of silicon photonics, or integrating photonics and electronics onto silicon chips, has gained significant advancement over the past decade. Silicon photonics has now found high-impact technological applications in optical communications and optical interconnections for data centers. Silicon photonics features the key merits of (i) compatibility with mature complementary-metal-oxide-semiconductor (CMOS) fabrication processes, (ii) optical transparency in the 1300-1600 nm-range telecommunication wavelengths, which are technologically important, (iii) high refractive index contrast between silicon and silica that enables photonic devices with compact footprint and thus favors potentially large-scale integration, (iv) low waveguide propagation loss (1.7 dB/cm), and (v) high data transmission rate (few tens of Gb/s).

Various research groups from academia and information technology and computer industries worldwide have demonstrated silicon photonic devices including wavelength-selective optical filters, multiplexers/demultiplexers (MUXs/DE-MUXs), optical delay lines, electro-optical modulators, optical switches and routers, photodetectors, hybrid-integrated lasers and so on. In many of these demonstrated devices, silicon micrometer-sized optical resonators (optical microresonators) in microring or microdisk form are adopted as the constituent functional elements due to their sharp resonances for wavelength selectivity, compact size, accessibility by integrated optical waveguides and tunability by way of thermo-optical (TO), electro-optical (EO), all-optical and opto-mechanical mechanisms.

Among available silicon refractive index tuning mechanisms, TO and EO effects are the two main mechanisms that are generally employed to dynamically control the silicon microresonator resonance wavelengths, and thus the operation wavelength range of the device. Silicon TO effect features the key merit of enabling a relatively large change in the refractive index n upon a change in temperature T ($\Delta n/\Delta T=1.86\times10^{-4}$ K$^{-1}$). However, the relatively large thermal conductivity of silicon also makes it difficult to localize the temperature change, and a combination of air-trenches and silicon undercuts surrounding the photonic device are often needed in order to localize the heat for TO tuning. Yet, the speed of thermal diffusion in silicon limits the response time to the μs-range and thus a relatively low modulation speed. Hence, silicon EO effect, which is dominated by the fast free-carrier plasma dispersion effect implemented by accumulating or injecting or depleting free-carrier densities in the optical field region, has become the preferred silicon refractive index tuning mechanism for high-speed optical switches, modulators and other silicon photonic devices that demand ns to sub-ns response times.

SUMMARY

In an embodiment, the invention provides an integrated silicon optical device capable of being monitored and tuned in real-time. The silicon optical device includes: a bus waveguide, comprising an input port and an output port; an optical microresonator coupled to the bus waveguide, configured to selectively receive light at a desired resonance wavelength from the bus waveguide; a photodetector, configured to electrically read out an operation condition of the optical microresonator; a diode-tuner, configured to blueshift or redshift the resonance wavelength of the optical microresonator; a micro-heater, configured to redshift the resonance wavelength of the optical microresonator; and a control unit, comprising a transimpedance amplifier (TIA) and a microprocessor, configured to implement a two-stage closed-loop tuning scheme.

BRIEF DESCRIPTION OF THE SEVERAL VIEWS OF THE DRAWINGS

The invention will be described in even greater detail below based on the exemplary figures. The invention is not limited to the exemplary embodiments. All features described and/or illustrated herein can be used alone or combined in different combinations in embodiments of the invention. The features and advantages of various embodiments of the invention will become apparent by reading the following detailed description with reference to the attached drawings which illustrate the following.

DETAILED DESCRIPTION

Figure 1A:
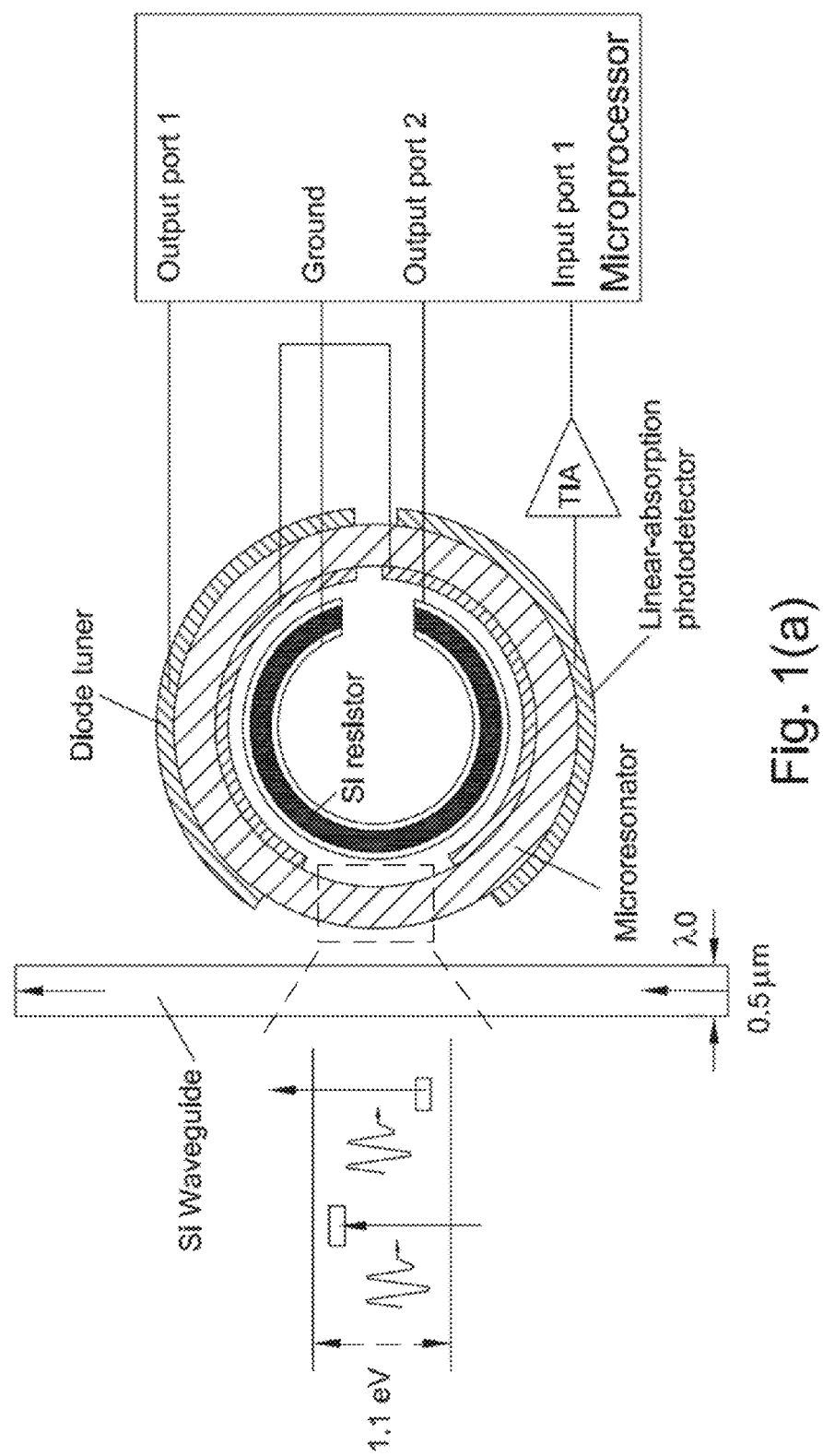
FIG. 1(a) is a diagram illustrating a top-down view of a silicon microring resonator laterally coupled with a silicon single-mode channel waveguide according to an embodiment.

Demonstrated performances of conventional silicon microresonator-based devices are often below expectation, and the expected yield for device fabrication is generally low despite using advanced fabrication processes. The main problem is that the silicon microresonator sharp resonance is extremely sensitive to minute albeit inevitable fabrication-induced imperfections and the resulting resonance wavelength deviations from the designed values can severely degrade the device operation. In order to mitigate the fabrication-induced resonance wavelength detuning, various post-fabrication permanent trimming methods have been developed. However, once the device is deployed, any environmental fluctuations such as chip temperature change or signal laser wavelength drift can also offset the spectral alignment between the resonance wavelength and the signal wavelength. Thus, in order to enable a steady operation of silicon microresonator-based devices without employing complicated off-chip monitoring or characterization equipment, embodiments of the invention provide on-chip real-time monitoring with closed-loop controlled resonance wavelength tuning for each constituent microresonator.

Another problem associated with conventional silicon microresonator-based devices is that, for future practical applications deployed in live telecommunication systems and optical interconnection systems, a large number of silicon microresonator-based devices are expected to be integrated and networked on the same chip, and the working condition of each microresonator may need to be actively reconfigured while carrying high-speed data.

Embodiments of the invention provide an on-chip method in order to monitor in real time, and in parallel, the optical performances for a large number of interconnected silicon microresonator-based devices. Based on such on-chip real-time monitoring, each microresonator can be actively and precisely reconfigured using closed-loop micro-control, and have high tolerance against environmental fluctuations.

The inventors' research group has previously shown that one can characterize all-silicon microresonator resonances by measuring the cavity-enhanced photocurrent generated along the optical resonance mode region that spatially overlaps with integrated P-I-N diodes, while wavelength-scanning the input-coupled laser in the 1550 nm wavelength range. See H. Chen et al., "Cavity-enhanced photocurrent generation by 1.55 μm wavelengths linear absorption in a p-i-n diode embedded silicon microring resonator", Appl. Phys. Lett. 95, 171111 (2009) (hereinafter "Chen I"), which is incorporated herein by reference in its entirety. The photocurrent measured at the microresonator resonance wavelengths can be orders of magnitude enhanced compared with that measured at an off-resonance wavelength due to the optical resonance fields built up in the microresonator. Thus, through measuring the microresonator-enhanced photocurrent as a function of the input-coupled laser wavelength, the microresonator optical resonance spectrum can be extracted by reading the photocurrent directly off the chip without using an external photodetector or an optical spectrum analyzer.

There are two intrinsic mechanisms for single-crystalline silicon with an indirect bandgap energy of ~1.1 eV to absorb sub-bandgap photons in the 1550 nm wavelength range (~0.8 eV), namely linear surface-state absorption (SSA) that occurs on surfaces and interfaces and dominates at a relatively low optical power (e.g. below ~500 μW in a sub-micrometer-sized silicon rib waveguide), and nonlinear two-photon absorption (TPA) that occurs primarily in the bulk and dominates only at a relatively high power (e.g. above ~500 μW in a sub-micrometer-sized silicon rib waveguide). See Chen I; H. Chen et al., "Two-photon absorption photocurrent in p-i-n diode embedded silicon microdisk resonators", Appl. Phys. Lett. 96, 191106 (2010) (hereinafter "Chen II"), which is incorporated by reference in its entirety.

TPA is a nonlinear optical process. In order to excite a band-to-band indirect transition in silicon using sub-bandgap photons of ~0.8 eV, two photons of identical or different frequencies need to be simultaneously absorbed such that the total photon energy absorbed exceeds the silicon indirect bandgap energy of ~1.1 eV. However, TPA as a third-order nonlinear optical process only happens at a low rate and thus imposes relatively high optical power. Thus, TPA is typically several orders of magnitude weaker than linear band-to-band absorption.

SSA is a linear optical process that pertains to surfaces and interfaces. The presence of the semiconductor surfaces and interfaces locally breaks the semiconductor crystalline symmetry and thus leads to energy states that are otherwise forbidden within the bandgap (so-called sub-bandgap states). Consequently, the energy band structure associated with surfaces and interfaces is distinctively different from that associated with the crystalline bulk. Localized surface states have long been recognized as responsible for band bending and the resulting electronic energy barriers at semiconductor interfaces. The trapped charges associated with localized surface states fall into either one of the two categories: i) intrinsic surface states that are present at the semiconductor-vacuum interface associated with the discontinuity in the lattice potential, or ii) extrinsic surface states associated with imperfections at the semiconductor interfaces (e.g., impurities or defects that exist in both semiconductor surfaces and the bulk). Such states within the bandgap thus enable charges to linearly absorb sub-bandgap photons and result in photocurrents.

Another linear-absorption-based photocurrent generation utilizes ion-implantation-induced defect states as an extrinsic mechanism to enhance photocurrent generation that can occur in the bulk. The defects that caused the discontinuity in the lattice potential results in dangling atomic bonds which, with or without reconstruction, produce localized states within the forbidden bandgap and enable charges to linearly absorb sub-bandgap photons and result in photocurrents. Various research groups have demonstrated defect-state-absorption-based photocurrent generation in silicon waveguides with implanted ions of $Si^+$, Boron, Helium, etc., typically using high implantation energy (in the order of hundreds of keV), with demonstrated responsivity of up to 0.5 A/W, and with relatively large optical absorption loss (around tens of dB/cm). For example, see Logan et al., "Analysis of resonance enhancement in defect-mediated silicon microring photodiodes operating at 1550 nm", J. Opt. 13, pp. 125503 (2011), which is incorporated by reference in its entirety.

In an embodiment, the invention provides an integrated optical device that utilizes the silicon linear absorption of sub-bandgap photons in silicon microresonator-based passive devices integrated with a PN or P-I-N diode in order to realize cavity-enhanced photodetection for on-chip in-microresonator real-time monitoring of the microresonator resonances, and the subsequent active modification of the microresonator resonances using either TO or EO tuning according to the photocurrent readout as a signal and controlled by electronic circuitry.

Before getting into the details of the embodiments of the invention depicted in the exemplary figures, an explanation of the overall principles of various embodiments of the invention is given to guide the reader. Embodiments of the invention provide an integrated optical device on a silicon-on-insulator (SOI) chip comprising a silicon optical microresonator with an in-microresonator photodetection-based monitoring and a closed-loop control scheme for active tuning. The microresonator is configured to resonate at a certain wavelength of light that propagates along an input-coupled bus waveguide. A PN or P-I-N junction photodetector integrated along a section of the microresonator circumference is employed to electrically read out relatively low-power light (e.g., in the 1300 nm-1600 nm telecommunication wavelengths) propagating in the microresonator upon linear absorption, and possibly upon zero bias. Another P-I-N or PN junction integrated along a section of the microresonator circumference serves to actively detune the microresonator resonance wavelengths through the silicon EO effect (free-carrier plasma dispersion) according to the photocurrent readout values. The junction also serves to realize high-speed function of the device, such as switching between "on" and "off" states for an EO switch or modulator. A ring-shaped heater integrated along the microresonator circumference is employed to actively red-detune the microresonator resonance wavelengths through the silicon TO effect, again according to the photocurrent readout values.

In an embodiment, the closed-loop control scheme for the said silicon waveguide-coupled microresonator is as follows.

An optical signal carried by a certain wavelength $\lambda_0$ at a low power is propagated in the bus waveguide, and then coupled to the microresonator with a designed resonance wavelength that matches $\lambda_0$. The integrated photodetector enables the linear-absorption-generated cavity-enhanced photocurrent at $\lambda_0$ to be electrically read out in real time. The photocurrent is then sent into the input of a microprocessor after amplification. The voltage values at two output ports of the microprocessor for the integrated junction (for tuning) and the integrated heater are locked at this "normal" data transmission state. Due to temperature change or other environmental variations (including possibly long-term signal laser wavelength drift), the alignment between the microresonator resonance wavelength and the signal wavelength detunes, resulting in a reduction in the photocurrent generated at $\lambda_0$. The unintended drop in the photocurrent triggers the electrical closed-loop control. The voltage value of the microprocessor output that drives the DC terminal of the tuner junction is to be adjusted first. In this embodiment, only when the EO tuning saturates will the thermal controller be activated to adjust the heater voltage value. The voltages at the two output ports of the microprocessor keep varying as described above until the photocurrent value is determined to exceed the set photocurrent value in the closed-loop control system. The voltage values at the two output ports are then locked again (having met the criteria for normal operation state).

Accordingly, embodiments of the invention enable the practical operation of an on-chip integrated optical system including a potentially large number of integrated silicon microresonators via real-time in-microresonator monitoring and closed-loop active tuning. The design of an integrated linear-absorption photodiode and tuners within a single microresonator allows monitoring and tuning of individual microresonators in the integrated optical system. This saves the need of extra off-chip or on-chip photodiodes, such as an additional microring-based photodetector, that can cause extra complications in aligning the resonance with the microresonator under monitor.

The design of the embodiments of the invention is based on the utilization of cavity-enhanced linear absorption-generated photocurrent as an electrical readout for actively controlling the microresonator resonance wavelength. The microresonator and its waveguide coupling can be in various forms, and the applications span WDM channel notch filters, optical delay lines, channel add-drop filters, EO switches, high-speed EO modulators, high-order-coupled microresonators, N×M switch matrices, photonic integrated circuits, etc.

Turning now to the figures, FIG. 1(a) illustrates a top-down view of an exemplary embodiment of the invention. In this exemplary embodiment, a silicon microring resonator is laterally coupled with a single silicon single-mode channel waveguide via a sub-micrometer gap spacing. The microring can be in circular, racetrack, square or any other ring shape that allows for optical feedback. The microring radius is in the range of a few to few tens of micrometers. The microring waveguide width and the coupled waveguide width are typically identical in order to enable phase matching (which allows for efficient optical coupling) between the microring and the waveguide.

A P-I-N or PN photodiode detector is integrated along a section of the microring spanning at least a quarter of the microring circumference (see the lower part of the microring in FIG. 1(a)). A P-I-N integrated waveguide photodiode, with the waveguide region being the intrinsic region, linearly absorbs sub-bandgap photons via the SSA effect on the waveguide and microring surfaces where only the evanescent field of the guided modes propagate. A PN integrated waveguide photodiode, with the waveguide region implanted by phosphorus (N⁻ doped) and boron (P⁻ doped) ions, can linearly absorb sub-bandgap photons via both the SSA effect and the defect-state-mediated absorption in the bulk of the waveguides and microrings where the optical mode field propagates. Thus, in the case of PN integrated waveguide photodiodes, it is possible to have a higher photoresponse with a higher waveguide propagation loss than the P-I-N integrated waveguide photodiode, and the linear-absorption effect can be tailored by adjusting the doping concentrations and the doped regions overlap with the optical mode, the implantation energies and the temperature and time of annealing. In an exemplary embodiment, experimental results (detailed below) revealed that the PN integrated waveguide photodiode responsivity (with microring resonance enhancement) reaches 18 mA/W (see FIG. 2(c) below), while the P-I-N integrated waveguide photodiode responsivity (with microring resonance enhancement) only reaches 2 mA/W.

Another P-I-N or PN junction acting as an EO tuner is integrated along another section of the microring spanning at least a quarter of the microring circumference (see the upper part of the microring in FIG. 1(a)). The diode-tuner can be either an integrated P-I-N diode for carrier-injection-based blue-tuning for over ~1 nm range, or an integrated PN diode for carrier-injection-based blue-tuning and carrier-depletion-based red-tuning for over ~0.2 nm range. In either case the optical mode is assumed to spatially overlap with the depletion region of the diode. The P-I-N diode features an intrinsic region in the silicon waveguide core and thus the waveguide exhibits a relatively low loss. Whereas, the PN diode requires the silicon waveguide core to be partitioned into P and N-doped regions, making the waveguide relatively lossy and also complicating the device fabrication, but enables a faster carrier sweep out and a shorter response time than an integrated P-I-N diode. FIG. 1(a) shows that the photodiode and the diode-tuner are not electrically connected, except through possible leakage currents along the silicon microring or the adjacent silicon slab layer.

Figure 1B:
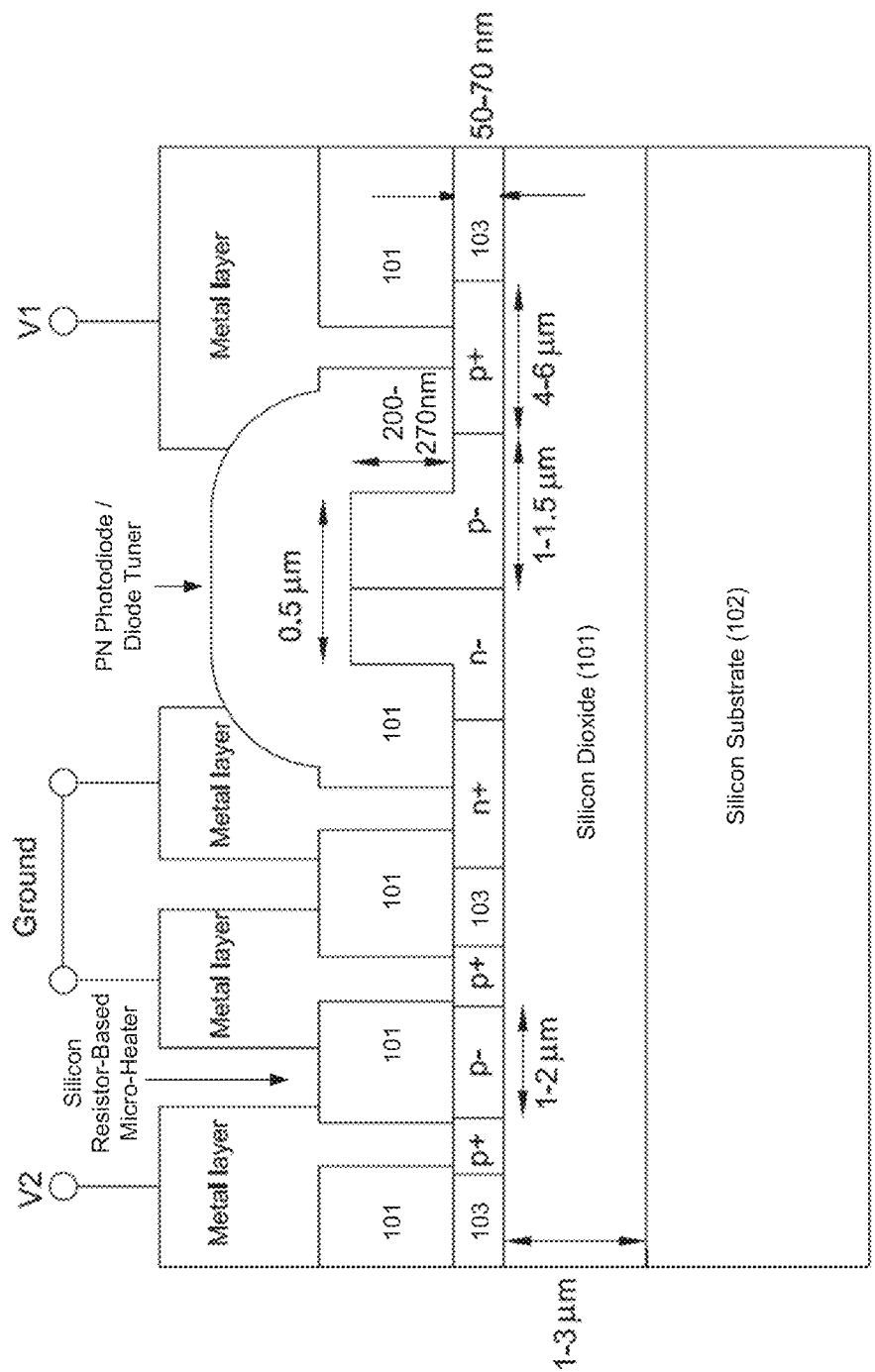
FIG. 1(b) is a diagram illustrating a cross-sectional schematic of an integrated PN photodetector or diode-tuner with the integrated silicon resistor.
Figure 1C:
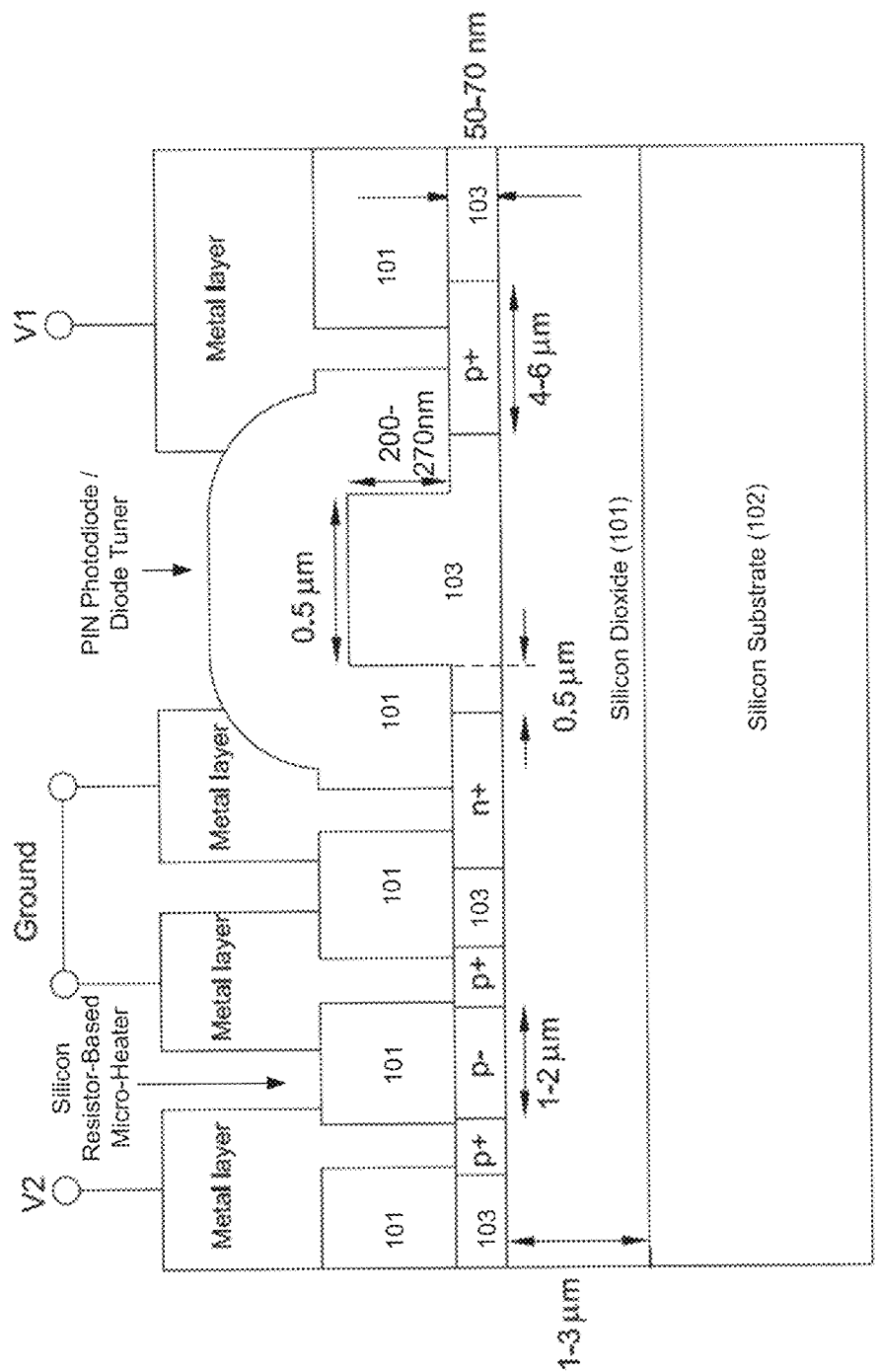
FIG. 1(c) is a diagram illustrating a cross-sectional schematic of an integrated P-I-N photodetector or diode-tuner with the integrated silicon resistor.

An open-ended ring-shaped silicon resistor serving as the TO tuner is located inside the microresonator and separated from the ring inner sidewall by a spacing of several micrometers (in order to avoid spatial overlap between the optical mode and the resistor). Although a space is depicted between the resistor structure and the diode tuner/photodetector structures in FIG. 1(a), it will be appreciated that both the resistor structure and the diode tuner/photodetector structures are connected via the same silicon-on-insulator substrate (as depicted in FIGS. 1(b) and 1(c)).

In an alternative embodiment, a metal micro-heater can be integrated over the microring and isolated from the microring surface by an oxide layer of about 1 μm thick (not pictured in FIG. 1(a)).

A transimpedance amplifier (TIA) is connected to the photodiode in order to amplify the electrical signal before it is read by a microprocessor-based closed-loop control circuit. Given a typical TIA noise figure is ~5 pA/√Hz, and an expected PN photodiode responsivity of 18 mA/W for a waveguided optical power of 100 μW, the noise figure can be set to be below 0.5 μA, corresponding to a data rate of 10 Gb/s. This means in principle that a real-time monitoring rate up to around 10 Gb/s can be attained using a PN photodiode with a 10 G-rated TIA and microprocessor are used. Similarly, for P-I-N photodiodes or PN photodiodes with a lower responsivity, e.g. 2 mA/W, the real-time monitoring data rate given a typical TIA noise figure could be up to around 0.5 Gb/s.

Two outputs of the microprocessor are connected to the diode-tuner and the TO tuner to actively tune the microresonator resonance wavelength following a feedback-controlled tuning scheme to be detailed below. The transimpedance for the TIA should be sufficient to amplify the electrical signal to reach the input voltage level of the microprocessor. Typically, for a photocurrent of 1 μA, a transimpedance of 20 kΩ can support an input voltage level>10 mV. Such specifications for the TIA and the microprocessor can be determined by one skilled in the art.

FIGS. 1(b) and 1(c) show exemplary cross-sectional structures for different embodiments of the invention. FIG. 1(b) schematically shows the cross-section of an integrated PN photodiode/diode-tuner (on the right side) together with a silicon resistor-based micro-heater across the microring resonator (on the left side). The $p^+$, $p^-$, $n^+$ and $n^-$ doped regions are formed by ion implantation in the silicon slab layer, and partially within the silicon waveguide for the PN diode. The $p^-$ concentration can be $\sim 2.7 \times 10^{18}$ cm$^{-3}$ and the $n^-$ concentration can be $\sim 4 \times 10^{18}$ cm$^{-3}$ (see exemplary embodiment with experimental results below). Exemplary dimensions for components of FIG. 1(b) are also depicted. Additionally, in FIG. 1(b), reference element 101 corresponds to a silicon dioxide layer, reference element 102 corresponds to a silicon substrate layer, and reference element 103 corresponds to silicon.

FIG. 1(c) schematically shows the cross-section of an integrated P-I-N photodiode/diode-tuner (on the right side) together with the integrated silicon resistor-based micro-heater across the microring resonator (on the left side). The $p^+$, $p^-$ and $n^+$ doped regions for the P-I-N diodes and the silicon resistor are formed by ion implantation in the silicon slab layer. Exemplary dimensions for components of FIG. 1(c) are also depicted. Additionally, in FIG. 1(c), reference element 101 corresponds to a silicon dioxide layer, reference element 102 corresponds to a silicon substrate layer, and reference element 103 corresponds to silicon.

The silicon resistor has a $p^-$ doped core (e.g. doping concentration of $\sim 2 \times 10^{17}$ cm$^{-3}$), which functions as the heater, while the $p^+$ doped regions (e.g. doping concentration of $\sim 5 \times 10^{19}$ cm$^{-3}$) embedded on each side are to lower the contact resistance.

An exemplary designed waveguide width for the silicon waveguide depicted on the left side of FIG. 1(a) is 0.5 μm. The microresonator and the waveguide can be fabricated on a commercially available SOI substrate following standard CMOS fabrication processes with photolithography and reactive ion etching. The SOI substrate has a silicon device layer of typically 220-340 nm thick on a buried oxide layer of typically 1-3 μm thick. A layer of low-temperature oxide (LTO) is deposited to cover the entire silicon device as an upper cladding. An Al layer is patterned on top of the LTO as the top electrode.

The embodiments of the invention depicted in FIGS. 1(a)-(c) are applicable to various device structures, including, e.g., wavelength-tunable WDM channel notch filters (band rejection filters) and optical delay lines, in which only a single bus waveguide is coupled to a microresonator.

Figure 1D:
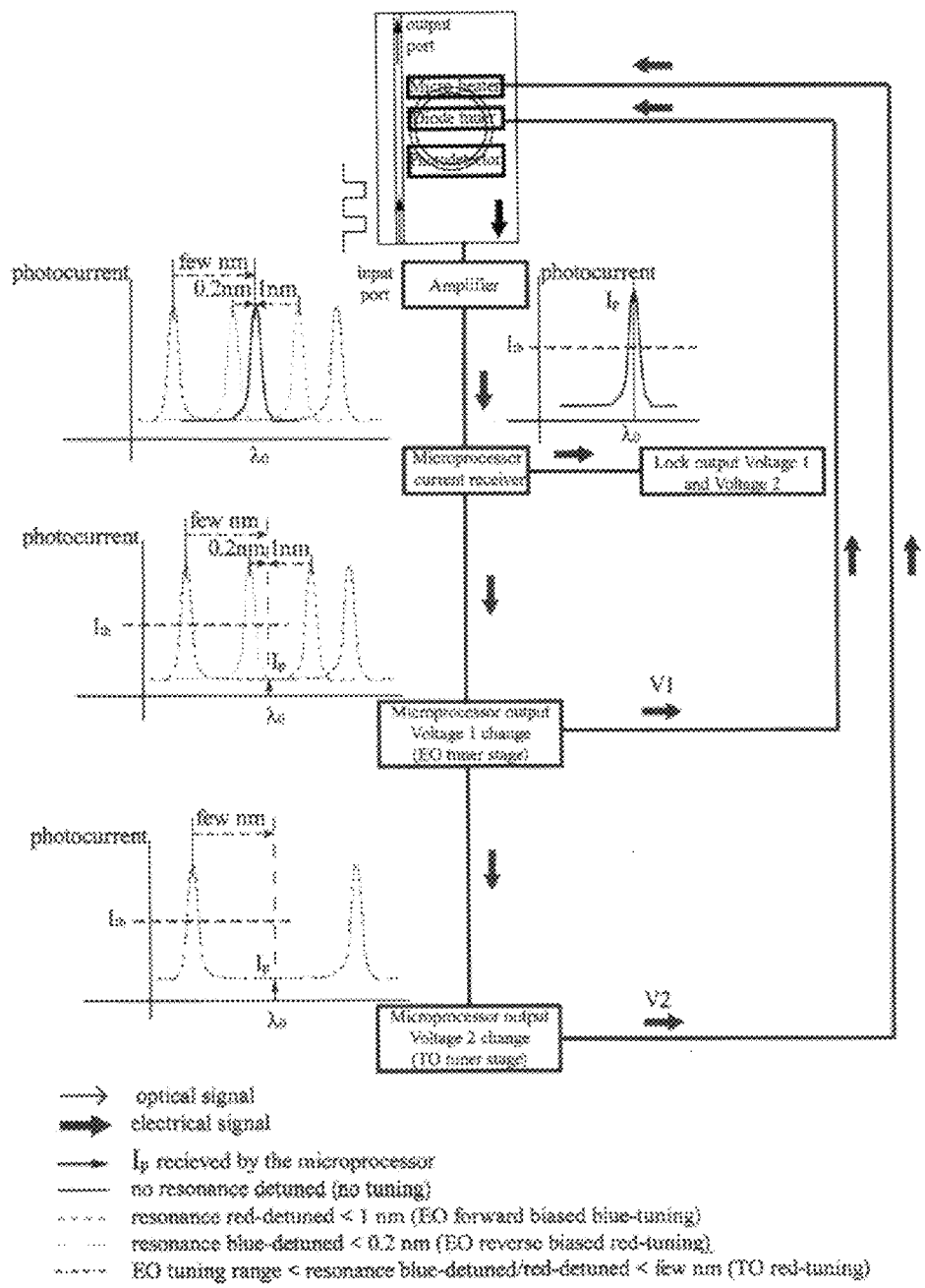
FIG. 1(d) is a block diagram illustrating real-time monitoring and two-stage closed-loop tuning for a single silicon microresonator-based device.

FIG. 1(d) illustrates the principles of a feedback-controlled tuning scheme according to an embodiment of the invention. At an initial state, the voltage values at output ports 1 (V1) and 2 (V2) of a microprocessor (e.g. a Single-Chip Microprocessor (SCM)) are set at a normal working state. A photocurrent threshold is set at $I_{th}$. In the case that the amplified photocurrent readout $I_p$ (upon zero bias for the photodetector) is above $I_{th}$, the microresonator is at an on-state indicating the signal laser wavelength $\lambda_o$ is aligned within the sharp microresonator resonance linewidth. In the event that $I_p$ is below $I_{th}$, the microresonator is at an off-state indicating $\lambda_o$ is outside the sharp resonance linewidth. It is possible that the microresonator be permanently trimmed or $\lambda_o$ is set such that the microresonator is at an on-state initially and V1 and V2 are both set at zero. For an input signal data rate larger than the bandwidth of the photodiode, TIA or microprocessor, $I_p$ is the time-average value. Embodiments of the invention can utilize a time-averaged photocurrent as an electrical monitoring signal, and thus do not require a high-speed TIA.

The photodiode monitor upon zero bias continuously reads out electrical signals in real time. Due to environmental variations (e.g. temperature drift or long-term signal laser wavelength drift), the alignment between the microresonator resonance wavelength and $\lambda_o$ can be offset beyond the resonance linewidth, and consequently $I_p$ can drop below $I_{th}$. Thus, during the device operation, there are four scenarios that could apply to the microresonator, namely (1) $\lambda_0$ is within the resonance linewidth, which is the desired case and no tuning is needed, (2) the resonance wavelength is unintentionally red-detuned from $\lambda_o$ by within ~1 nm of the EO blue-tuning range (injection mode), (3) the resonance wavelength is unintentionally blue-detuned from $\lambda_o$ by within ~0.2 nm of the EO red-tuning range (depletion mode) (only applicable when using a PN diode-tuner), (4) the resonance wavelength is either unintentionally red-detuned from $\lambda_o$ by above 1 nm or blue-detuned from $\lambda_o$ by above 0.2 nm but within the TO tuning range.

Embodiments of the invention design the free spectral range (FSR) of the microresonator to be within tens of nm (i.e. the microresonator round-trip length to be above 80 μm but shorter than 450 μm) in order to be within the TO tuning range in all cases. Embodiments of the invention also design the quality factor Q of the microresonator to be in the range of 3,500-20,000 (i.e. the resonance full-width half-maximum (FWHM) linewidth to be within 0.08 nm-0.4 nm at 1550 nm wavelengths in order to be sufficiently wide to transmit 10-40 Gb/s data, yet maintain a sufficient level of cavity enhancement).

Once the microprocessor receives a photocurrent value (post-amplification) of $I_p < I_{th}$ at $\lambda_o$, the two voltage values are to be unlocked, followed by a two-stage resonance wavelength tuning. At stage one, the microprocessor outputs a voltage V1 to bias across the diode-tuner. In the case of scenario 2 described above, EO carrier-injection-based blue-tuning can return the resonance wavelength back to $\lambda_0$. In the case of scenario 3, EO carrier-depletion-based red-tuning can return the resonance wavelength back to $\lambda_0$. Only in the case that EO tuning saturates (scenario 4) does the TO controller, which is controlled by another voltage output-port of the microprocessor, activate to adjust the integrated Si resistor or metal heater voltage value V2. Hence, there is a possibility that TO tuning power consumption or thermally loading the device is not needed. The tuning action ends when the photocurrent exceeds $I_{th}$ at $\lambda_o$ (scenario 1). The V1 and V2 values are then locked again.

The maximum tuning power consumption required by embodiments of the invention in scenarios 2-4 is estimated as follows. Following the cavity resonance phase matching condition, the resonance wavelength detuning $\Delta\lambda$ upon TO or EO tuning for a fixed resonance order and a fixed cavity round-trip length is given by:

$$\Delta\lambda = \lambda \Delta n_{eff}/n_{eff} \quad (1)$$

where $\lambda$ is the resonance wavelength in free space, $n_{eff}$ is the effective refractive index of the silicon microring waveguide and $\Delta n_{eff}$ is the effective refractive index change upon the tuning. $\lambda$ is assumed to be within the telecommunications C-band (~1525 nm to ~1560 nm) and $n_{eff}$ is assumed to be ~2.67.

In scenario 2, a resonance wavelength blue-detuning of $\Delta\lambda \approx 1$ nm in 1550 nm imposes a $\Delta n_{eff}$ of $\sim 1.7 \times 10^{-3}$, which suggests a carrier injection of $\sim 2 \times 10^{18}$ cm$^{-3}$, according to the empirical equations by Soref and Bennett as follows $$\Delta n = \Delta n_e + \Delta n_h = -(8.8 \times 10^{-22} \Delta N_e + 8.5 \times 10^{-18} \Delta N_h^{0.8}) \quad (2)$$

$$\Delta\alpha = \Delta\alpha_e + \Delta\alpha_h = 8.5 \times 10^{-18} \Delta N_e + 6.0 \times 10^{-18} \Delta N_h \quad (3)$$

where $\Delta n_e$ is the change in refractive index resulting from change in free electron carrier concentration $\Delta N_e$ (cm$^{-3}$), $\Delta n_h$ is the change in refractive index resulting from change in free hole carrier concentration $\Delta N_h$ (cm$^{-3}$), $\Delta\alpha_e$ is the change in absorption coefficient resulting from change in free electron carrier concentration, and $\Delta\alpha_h$ is the change in absorption coefficient resulting from change in free hole carrier concentration. It will be appreciated that Soref and Bennett's equations may be found in R. Soref and B. Bennett, "Electrooptical effects in silicon," Quantum Electronics, IEEE Journal, 23, 123-129 (1987)

Such a free carrier concentration increment typically requires a forward bias voltage of ~1 V (for example, see L. Zhou and A. W. Poon, "Silicon electro-optic modulators using pin diodes embedded 10-micron-diameter microdisk resonators," Optics Express 14, 6851-6857 (2006), which is incorporated by reference herein in its entirety). For a typical micro-sized ring resonator, the carrier injection current required is only in the order of 10 μA, indicating a DC power consumption in the order of 10 μW, which is much less than the TO tuning power consumption for the same wavelength tuning range as to be shown below.

In scenario 3, a resonance wavelength red-detuning of $\Delta\lambda \approx 0.2$ nm in 1550 nm imposes a $\Delta n_{eff}$ of $\sim 3.4 \times 10^{-4}$, which suggests a carrier depletion of $\sim 4 \times 10^{17}$ cm$^{-3}$, according to Eq. (2). Such a free carrier concentration depletion typically requires a reverse bias voltage of $\sim -3$ V (for example, see P. Dong, S. Liao, D. Feng, H. Liang, D. Zheng, R. Shafiiha, C.-C. Kung, W. Qian, G. Li, X. Zheng, A. V. Krishnamoorthy, and M. Asghari, "Low Vpp, ultralow-energy, compact, high-speed silicon electro-optic modulator," Opt. Express 17, 22484-22490 (2009), which is incorporated by reference herein in its entirety). For a typical micro-sized ring resonator, the carrier depletion current required is in the order of nA, indicating a DC power consumption in the order of nW. Such a power consumption is significantly less than the TO tuning power consumption for the same wavelength tuning range.

In scenario 4, in order to obtain a resonance wavelength red-detuning of $\Delta\lambda \approx 1$ nm by TO tuning, the temperature increment $\Delta T$ needed for the silicon waveguide is ~12° C. (given the silicon TO coefficient of ~1.86×10$^{-4}$/° C.). Given a typical resistor-based heater of ~600Ω and a distance of 1 μm from the waveguide, the power consumption is ~0.3 nm/mW (for example, see G. Li, X. Zheng, J. Yao, H. Thacker, I. Shubin, Y. Luo, K. Raj, J. E. Cunningham, and A. V. Krishnamoorthy, "25 Gb/s 1V-driving CMOS ring modulator with integrated thermal tuning," Opt. Express 19, 20435-20443 (2011), where the integrated heater had a resistance of ~750Ω with a demonstrated tuning efficiency of 0.19 nm/mW). Thus, for a resonance wavelength red-detuning of 1 nm, the TO tuning power consumption is ~3.3 mW upon an applied voltage of ~1.4 V across the resistor. This analysis shows some of the advantages of using a two-stage tuning scheme where the use of the TO tuning is minimized by using only EO tuning whenever EO tuning alone is sufficient.

According to embodiments of the invention, $I_p > I_{th}$ is acquired at resonance wavelengths of the microresonator due to cavity enhancement. The microresonator effectively stores optical energy for a number of round trips within a small footprint. At on-resonance wavelengths, an enhanced circulating optical power is carried inside the microresonator over the optical power carried in the coupled waveguides. For example, Chen I shows an enhancement factor of up to 20 times for a silicon microring resonator with a quality factor of 8000.

Turning now to FIGS. 2(a)-2(j), experimental results from an exemplary embodiment of the invention will be discussed. In this experiment, silicon waveguide-coupled racetrack-shaped microring resonators with embedded PN photodiode detectors along most of the microring circumference (except the waveguide-to-ring coupling region) were designed and fabricated on a SOI substrate. The 4" SOI wafer has a 250 nm silicon device layer on a 3 µm buried oxide layer. The microring circumference is ~235 µm with the waveguide-to-ring interaction length of 20 µm. For the initial design of the PN diode, the doping concentrations were $4 \times 10^{18}$ cm$^{-3}$ for the n$^-$ region (40 keV implantation energy) and $2.7 \times 10^{18}$ cm$^{-3}$ for the p$^-$ region (100 keV implantation energy). These concentrations are to be optimized for the sub-bandgap linear absorption photodetection purpose. The interface between the p$^-$ and n$^-$ regions was designed to be 100 nm offset from the waveguide center in order to enable a good spatial overlap between the waveguide mode field maximum and the diode depletion region. The rib waveguide width is 500 nm and the etched height is 200 nm, with a slab height of 50 nm. The doping concentrations for the p$^+$ and n$^+$ regions (for Ohmic contact), which are ~0.5 µm away from the waveguide sidewalls, are $\sim 1 \times 10^{20}$ cm$^{-3}$. Rapid thermal annealing was used to anneal the device with pre-heat temperature of 600° C. for 10 s and process temperature of 1000° C. for 30 s. The devices were patterned by i-line photolithography and reactive ion etching. The devices are oxide-clad without intentional surface treatments before metal deposition for electrical contacts.

Figure 2A:
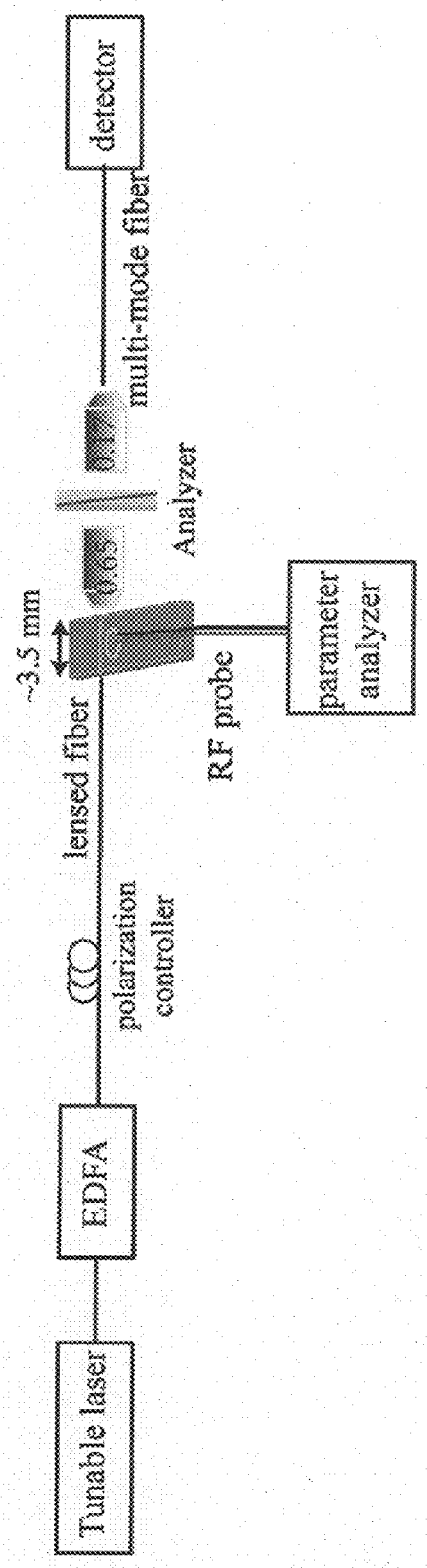
FIG. 2(a) is a diagram illustrating an experimental setup for optical transmission and photocurrent spectrum measurements.

FIG. 2(a) schematically illustrates the measurement setup used to obtain the experimental results. The wavelength-tunable laser light in the 1550 nm range is amplified by an erbium-doped fiber amplifier (EDFA), and the amplified laser light end-fired to a test chip (~3.5×15 mm$^2$) using a polarization-maintaining lensed single-mode fiber aligned to the transverse electric (TE) polarization. The transmission from the chip is imaged by a microscope objective lens (NA 0.65) onto a multimode fiber which is coupled to a photodiode detector.

In order to estimate the optical power coupled to the microring, the optical loss of the lens-to-multimode-fiber light collection system was calibrated to be 10 dB, using a lensed fiber with a spot diameter of ~4.25 µm at 1/e$^2$ directly imaged by the system. With a tapered waveguide width of ~4 µm at the waveguide output facet, the waveguide output-to-photodetector loss was therefore assumed to also be 10 dB. From a control experiment on another test chip from the same fabrication run, it was extracted from a microring resonance transmission that the waveguide propagation loss is 8.9 dB/cm. Thus, in the case that the microring is located at about 1 mm length from the waveguide output facet, the optical power coupled to the microring was estimated to be ~11 dB larger than the measured transmission at an off-resonance wavelength.

Figure 2B:
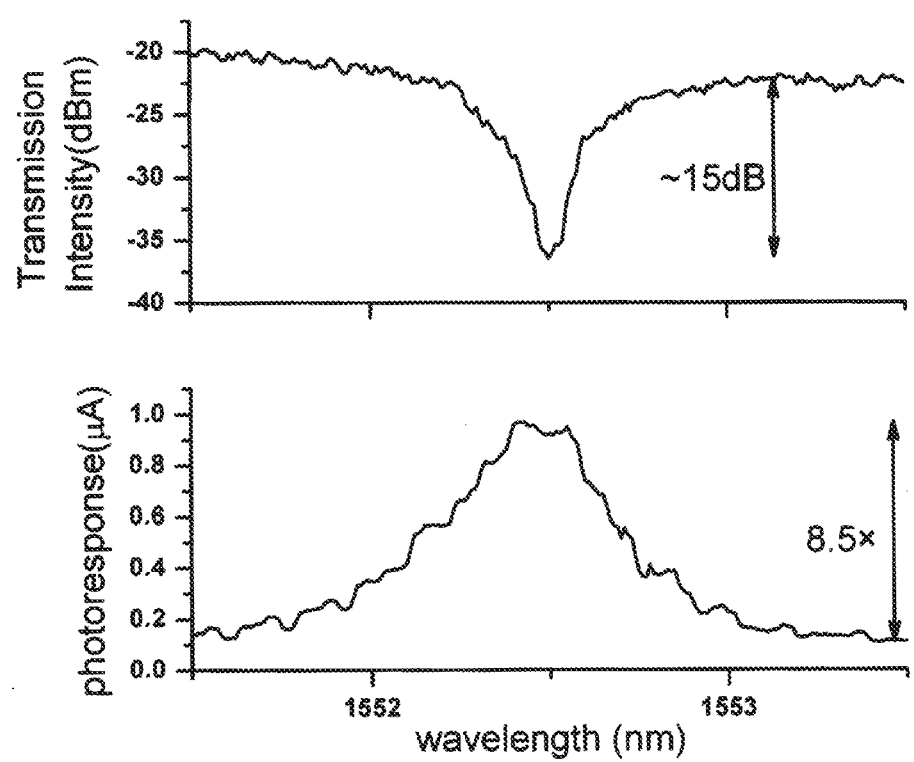
FIG. 2(b) depicts graphs illustrating measured optical throughput transmission spectrum with the corresponding photoresponses of a silicon microring resonator with an integrated PN photodiode.

FIG. 2(b) shows the measured optical transmission spectrum and the corresponding photoresponse. At room temperature, the optical spectrum reveals a resonance Q of ~4700 and an extinction ratio>15 dB. At an estimated optical power of ~50 µW coupled to the microring, an on-resonance photocurrent of ~0.9 µA and an off-resonance photocurrent of ~0.1 µA were obtained.

Figure 2C:
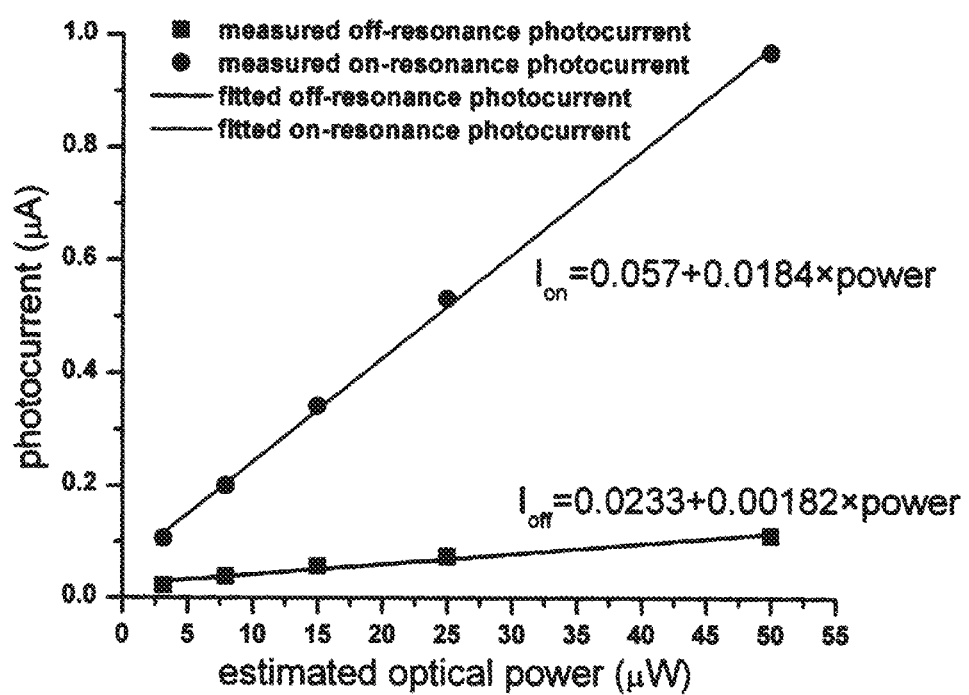
FIG. 2(c) depicts a graph illustrating measured on- and off-resonance photocurrents with different estimated input optical powers.

FIG. 2(c) shows the measured on- and off-resonance photocurrents with different estimated input optical powers. The photoresponses are linear from an estimated input power of 3 µW to 50 µW. The fitted on-resonance responsivity is ~18 mA/W and the fitted off-resonance responsivity is ~1.8 mA/W, indicating an on- to off-resonance responsivity enhancement of 10.

Figure 2D:
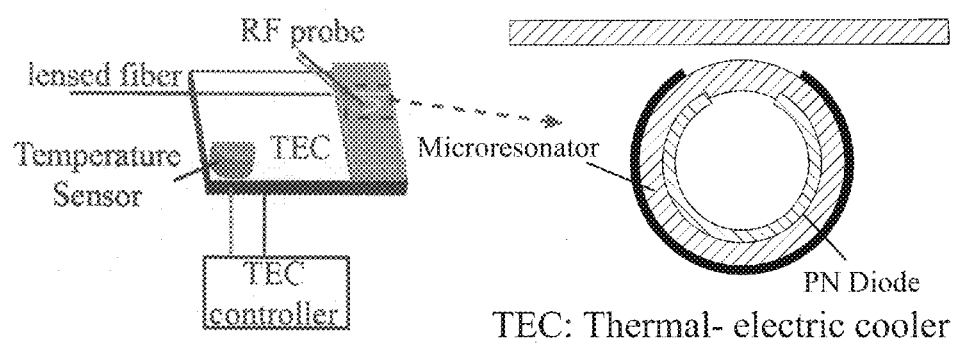
FIG. 2(d) is a diagram illustrating an experimental setup for a temperature dependence study of a microring resonator with an integrated PN photodiode.

In order to demonstrate the continuous monitoring of the microresonator resonance upon resonance TO tuning, the photoresponses were measured upon an elevated chip temperature. FIG. 2(d) schematically illustrates the measurement setup. A test chip (different from that used in the responsivity measurement but fabricated from the same run) is thermally coupled to a thermal-electric cooler (TEC). A diode-based temperature sensor is mounted on one corner of the TEC. Here the laser light is not amplified and thus a significantly lower optical power is coupled to the microring.

Figure 2E:
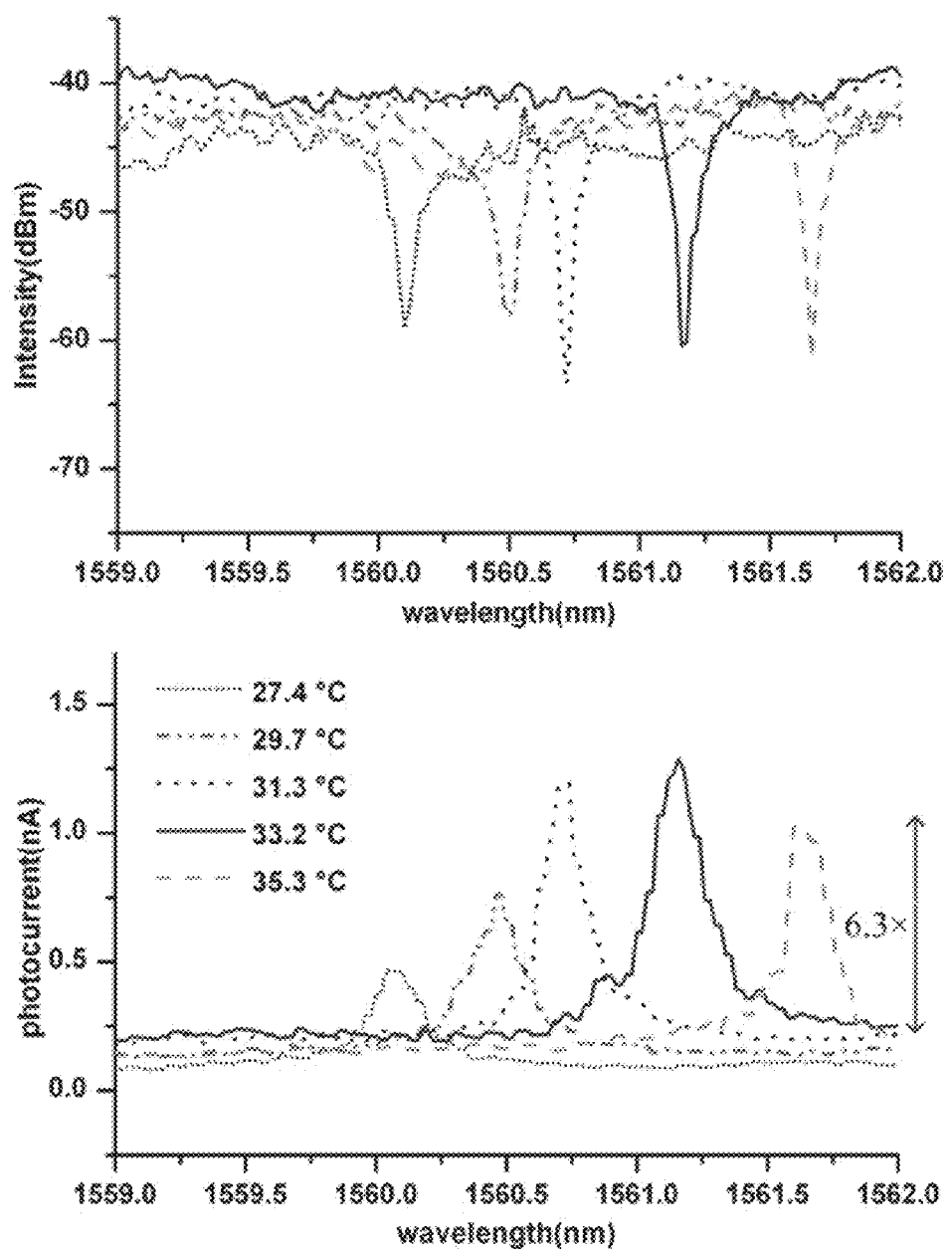
FIG. 2(e) depicts a graph illustrating measured temperature-dependent optical throughput transmission spectrum and a graph illustrating measured corresponding on-resonance photocurrent responses with temperature increases.
Figure 2F:
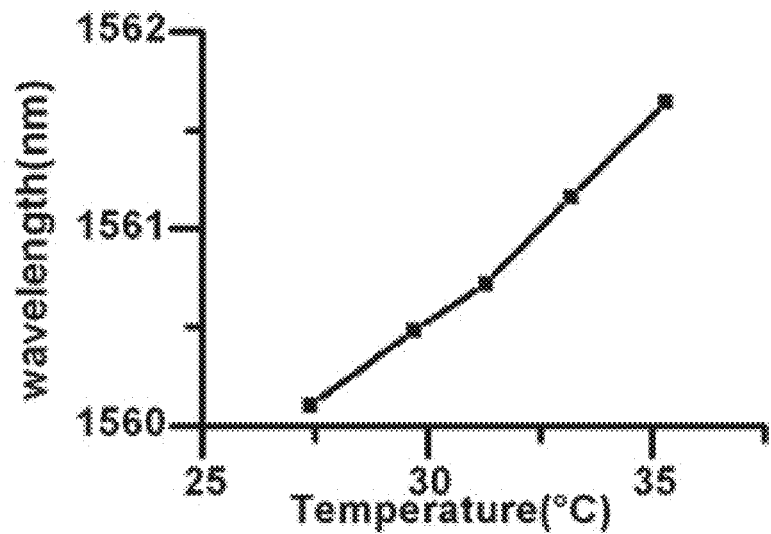
FIG. 2(f) depicts a graph illustrating measured resonance wavelength red-shifts with the temperature increases and a graph illustrating measured photocurrent enhancement factor with the temperature increases.
Figure 2F:
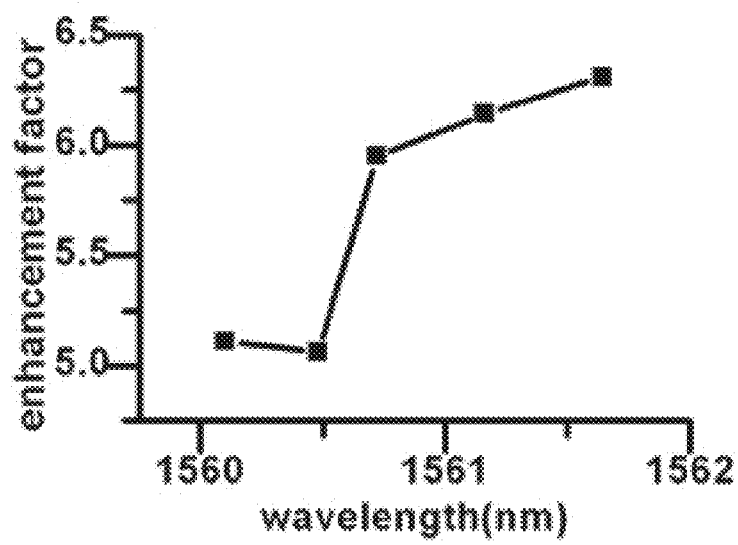

FIG. 2(e) (top graph) shows the measured optical transmission spectra with temperature. At 27.4° C., the optical spectrum reveals a resonance Q of ~3800 and an extinction ratio of >15 dB, suggesting an efficient optical injection to the optical resonance. With the TEC temperature increases to 35.3° C., the resonance wavelength is red-shifted by ~1.5 nm. FIG. 2(f) (top graph) summarizes the measured resonance wavelength red-shifts with temperature. The measured red-shifting efficiency is ~0.19 nm/° C., which is however double the theoretical expectation according to the silicon TO coefficient ($\sim 1.86 \times 10^{-4}$/° C.). This discrepancy may be attributed to a poor thermal coupling between the TEC and the sensor.

FIG. 2(e) (bottom graph) shows the corresponding measured photocurrent responses with temperature. At 35.3° C., a maximum photocurrent enhancement of 6.3 times is obtained for the on-resonance photocurrent (~1.3 nA) from the off resonance photocurrent (~0.19 nA). FIG. 2(f) (bottom graph) summarizes the measured photocurrent enhancement factor with temperature. The enhancement factor exhibits an overall increment from ~5× to ~6.3× with temperature increases, indicating the sub-bandgap linear-absorption-based PN photodetector works at a raised temperature. Variances in the on-resonance photoresponses at different temperatures may be attributed to a possible thermal-induced drift in the chip mounting, which affects the fiber-to-chip alignment and thus the input-coupled optical power.

Figure 2G:
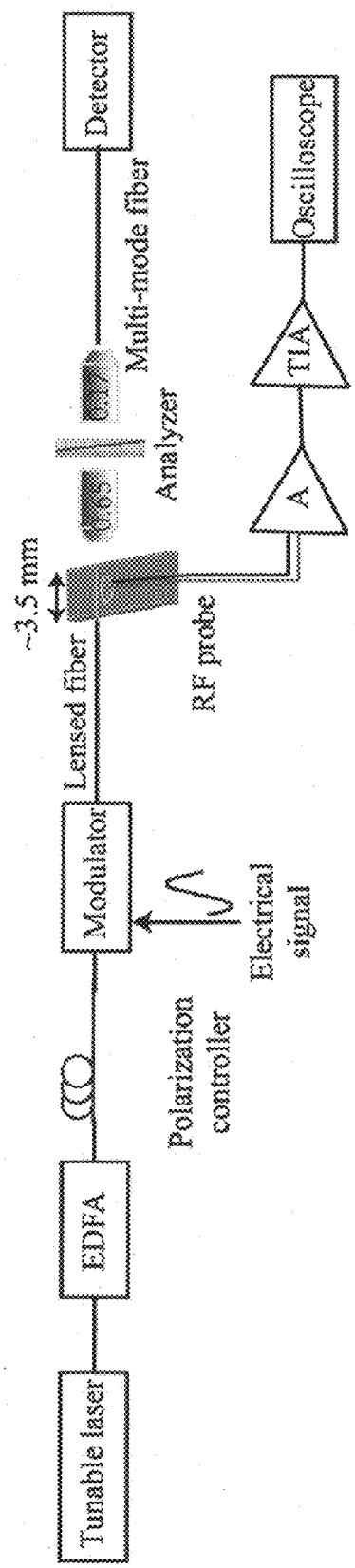
FIG. 2(g) is a diagram illustrating an experiment setup for frequency response measurement.
Figure 2H:
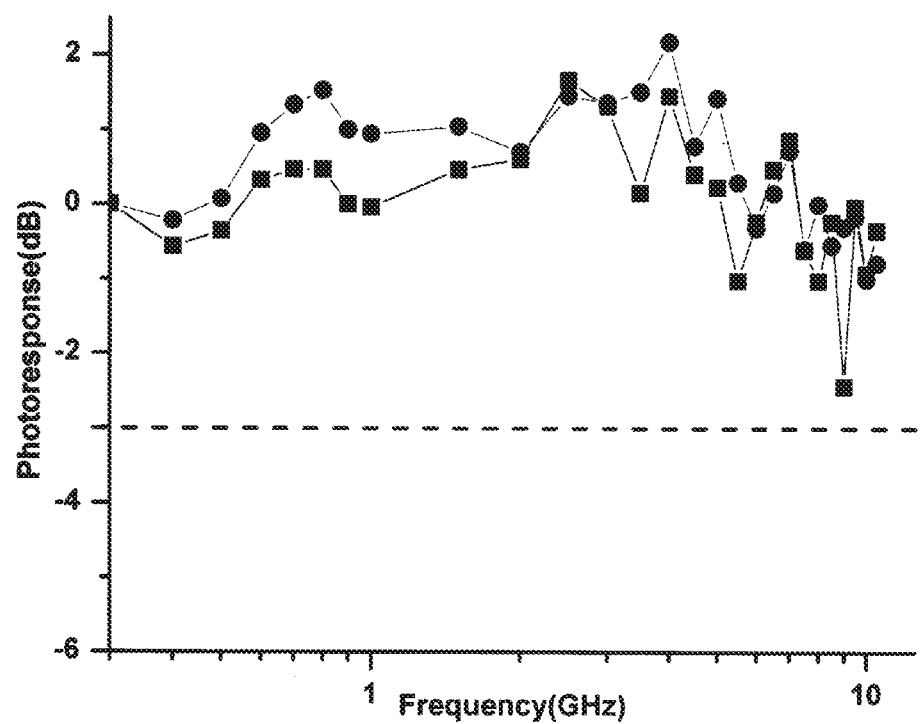
FIG. 2(h) depicts a graph illustrating measured frequency response of the device.

FIG. 2(g) schematically shows an experimental setup used to characterize the frequency response of the microring photodetector so as to demonstrate that the PN sub-bandgap linear-absorption photodetector can respond at a high data rate (although, as noted above, embodiments of the invention do not require high-speed photodetection). Here the microring has a racetrack shape with 15 µm arc radius and 20 µm interaction lengths. Experiment results revealed a photocurrent response enhancement factor of ~5 at a microring resonance of Q ~4000 upon zero bias and at room temperature (not shown). In order to measure the photodiode frequency response, the input-coupled laser spectrally aligned to the microring resonance wavelength is intensity-modulated with a sine wave and is amplified by an EDFA. The peak-to-peak value of the modulated photocurrent from the PN photodiode upon −3V bias was extracted as a function of the modulation frequency by an oscilloscope. The photocurrent is amplified by a low-noise amplifier and a TIA. FIG. 2(h) shows the two measured frequency responses from the same device, revealing the on-resonance photoresponse 3 dB bandwidth exceeding 10 GHz. This suggests that the sub-bandgap linear-absorption-based PN photodetector can respond at a high data rate, and can be adopted for high-speed data monitoring.

Turning now to FIG. 3(a)-FIG. 9, other exemplary embodiments of the invention will be described.

Figure 3A:
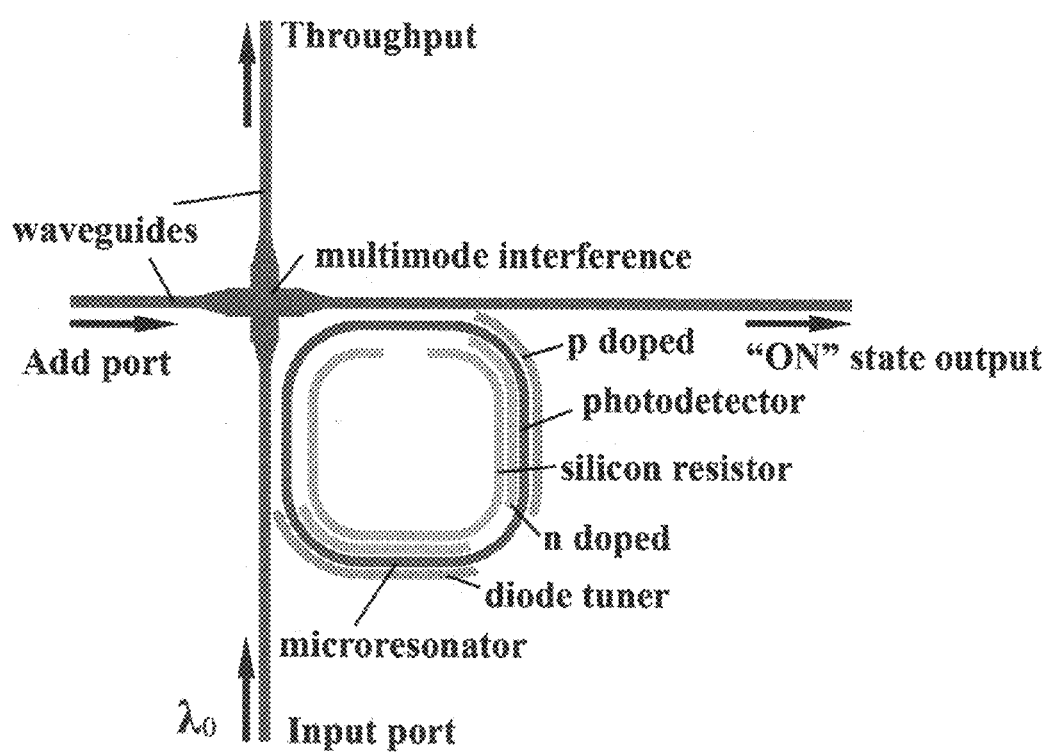
FIG. 3(a) is a diagram illustrating an embodiment of the invention with a single microring resonator and an MMI-based waveguide crossing-coupled electro-optical switch.

FIG. 3(a) schematically shows an embodiment applied to a WDM channel add-drop filter on a SOI substrate. A microring resonator integrated with a P-I-N or PN photodetector, a micro-heater and another P-I-N or PN diode for EO tuning is side-coupled with two parallel single-mode bus waveguides, forming an optical device with four waveguide ports. The alignment between the resonance wavelength and the signal wavelength $\lambda_o$ can be monitored and controllably tuned in real time as described with the single waveguide-coupled device in FIG. 1(a). The signal wavelength $\lambda_o$ is routed to the drop-port, while other wavelengths detuned from the microring resonances are routed to the through-port. It will be appreciated that the closed-loop control scheme (not shown) may be similar to that as described with respect to FIG. 1(d).

Figure 3B:
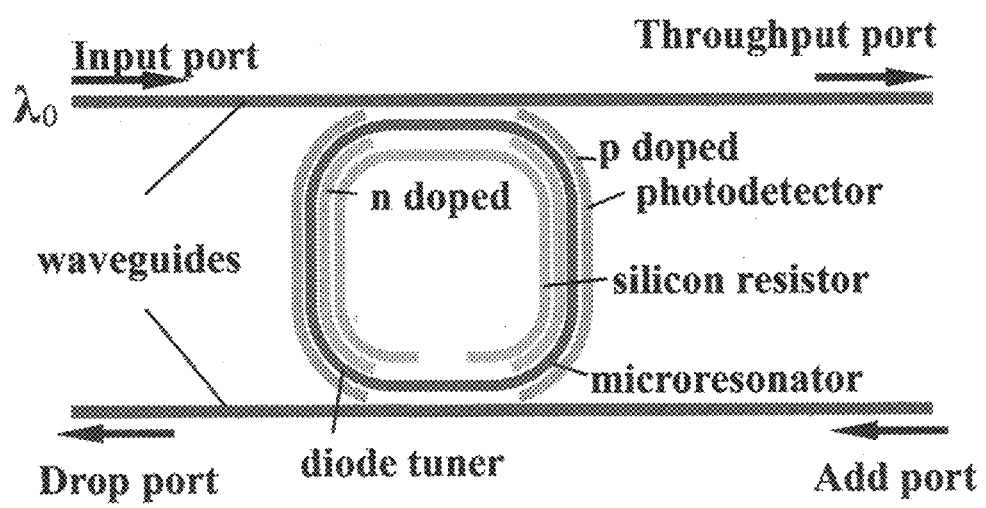
FIG. 3(b) is a diagram illustrating an embodiment of the invention with a single microring resonator and a channel add-drop filter.

FIG. 3(b) schematically shows an embodiment applied to a waveguide-crossing-coupled EO switch element on a SOI substrate. A microring resonator integrated with a P-I-N or PN photodetector, a micro-heater and another P-I-N or PN diode for EO tuning is side-coupled to a single-mode waveguide-crossing, forming an optical device with four waveguide ports. A multimode-interference (MMI) region is adopted at the crossing junction interfaced to four waveguide tapers. This crossing configuration is described in H. Chen and A. W. Poon, "Low-loss multimode-interference-based crossings for silicon wire waveguides," Photonics Technology Letters, IEEE 18, 2260-2262 (2006) ("Chen III"), which is incorporated by reference herein in its entirety. At an on-state, the microring resonance wavelength is set to align to the signal wavelength $\lambda_o$ and $\lambda_o$ is routed from the input-port to the drop-port. At an off-state, the microring resonance wavelength is detuned from $\lambda_o$ and $\lambda_o$ is routed from the input-port to the throughput-port. It will be appreciated that the closed-loop control scheme (not shown) may be similar to that as described with respect to FIG. 1(d).

The monitoring and tuning take place only after the switch on- or off-state has been set. For the on-state, the controlled tuning scheme is as described with respect to FIG. 1(d). For the off-state, the signal light at $\lambda_o$ essentially by-passes the resonator and the photocurrent obtained is essentially the dark current and thus below the threshold $I_{th}$. The tuning mechanism is not triggered. However, in the event that the resonance wavelength is not completely detuned from $\lambda_o$, and $I_p$ exceeds $I_{th}$, the tuning mechanism is then triggered to detune the resonance wavelength from $\lambda_o$ following the "EO-first-TO-second" two-stage tuning as described with respect to FIG. 1(d), until $I_p$ drops below $I_{th}$.

Figure 4A:
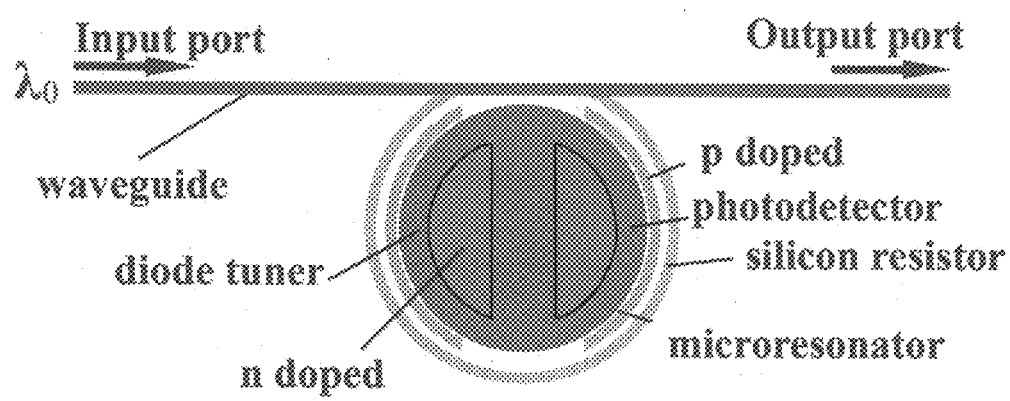
FIG. 4(a) is a diagram illustrating an embodiment of the invention with a single whispering-gallery-mode microdisk resonator in the context of an electro-optical modulator.
Figure 4B:
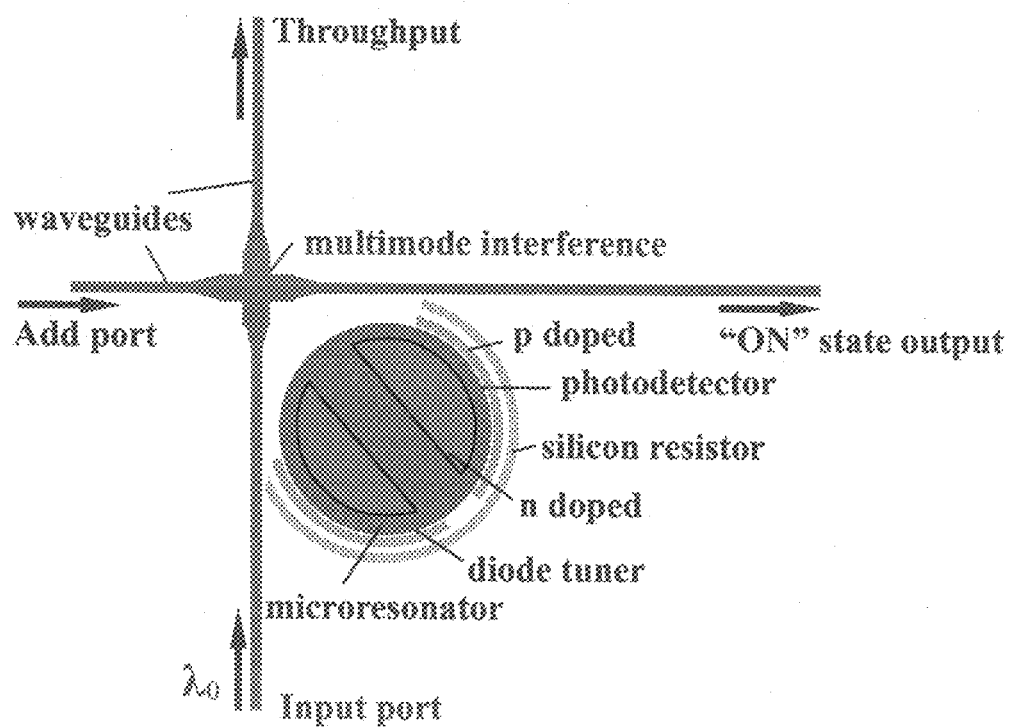
FIG. 4(b) is a diagram illustrating an embodiment of the invention with a single whispering-gallery-mode microdisk resonator in the context of an MMI-based waveguide crossing-coupled based electro-optical switch.
Figure 4C:
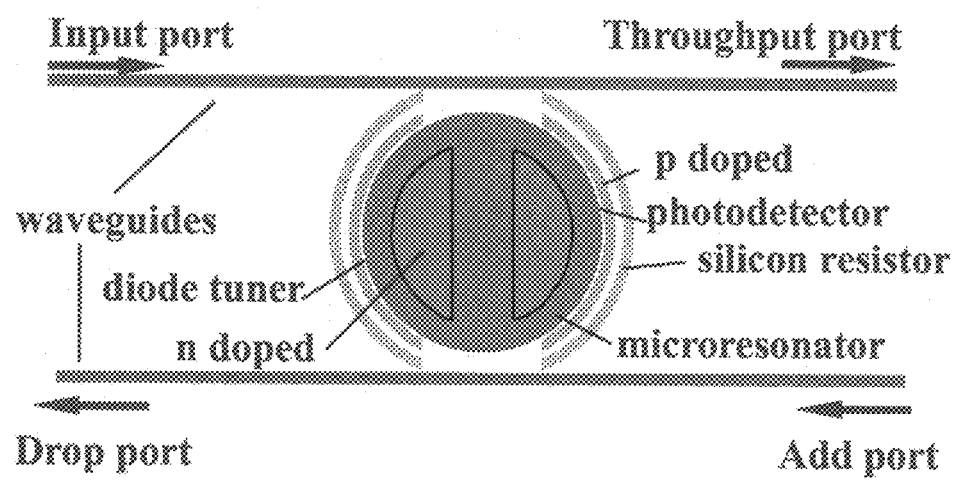
FIG. 4(c) is a diagram illustrating an embodiment of the invention with a single whispering-gallery-mode microdisk resonator in the context of a channel add-drop filter.

FIGS. 4(a)-4(c) schematically show a series of embodiments applied to whispering-gallery-mode (WGM) microdisk resonator-based devices on a SOI substrate. A microdisk resonator typically features a higher Q resonator (thus larger cavity enhancement) compared to a microring resonator of the same size and refractive index, because a microdisk only has an outer sidewall which causes relatively less scattering loss while a microring has both an outer and inner sidewalls which cause relatively severe scattering loss. However, a microdisk resonator typically supports multiple WGMs, which may complicate the spectral response. The fact that a microdisk only has one outer sidewall also compromises the surface area for SSA-based linear photodetection. In these embodiments, the microdisk is integrated with a ring-shaped Si resistor-based micro-heater outside the microdisk with 1-3 µm separation from the microdisk edge. A P-I-N or PN photodetector is integrated along approximately half of the microdisk circumference, while another P-I-N or PN diode-tuner is integrated along approximately another half of the microdisk circumference.

FIG. 4(a) schematically illustrates a microdisk resonator coupled to a single single-mode bus waveguide as a notch filter/optical delay line. FIG. 4(b) schematically shows a microdisk resonator coupled between two single-mode bus waveguides as a channel add-drop filter. FIG. 4(c) schematically shows a microdisk resonator coupled to a single-mode waveguide crossing with a MMI structure at the junction as a switch element. It will be appreciated that the closed-loop control scheme (not shown) may be similar to that as described with respect to FIG. 1(d).

It will be appreciated that, like microring resonator-based devices, microdisk resonator-based devices may be implemented in various different ways in different embodiments.

Figure 5:
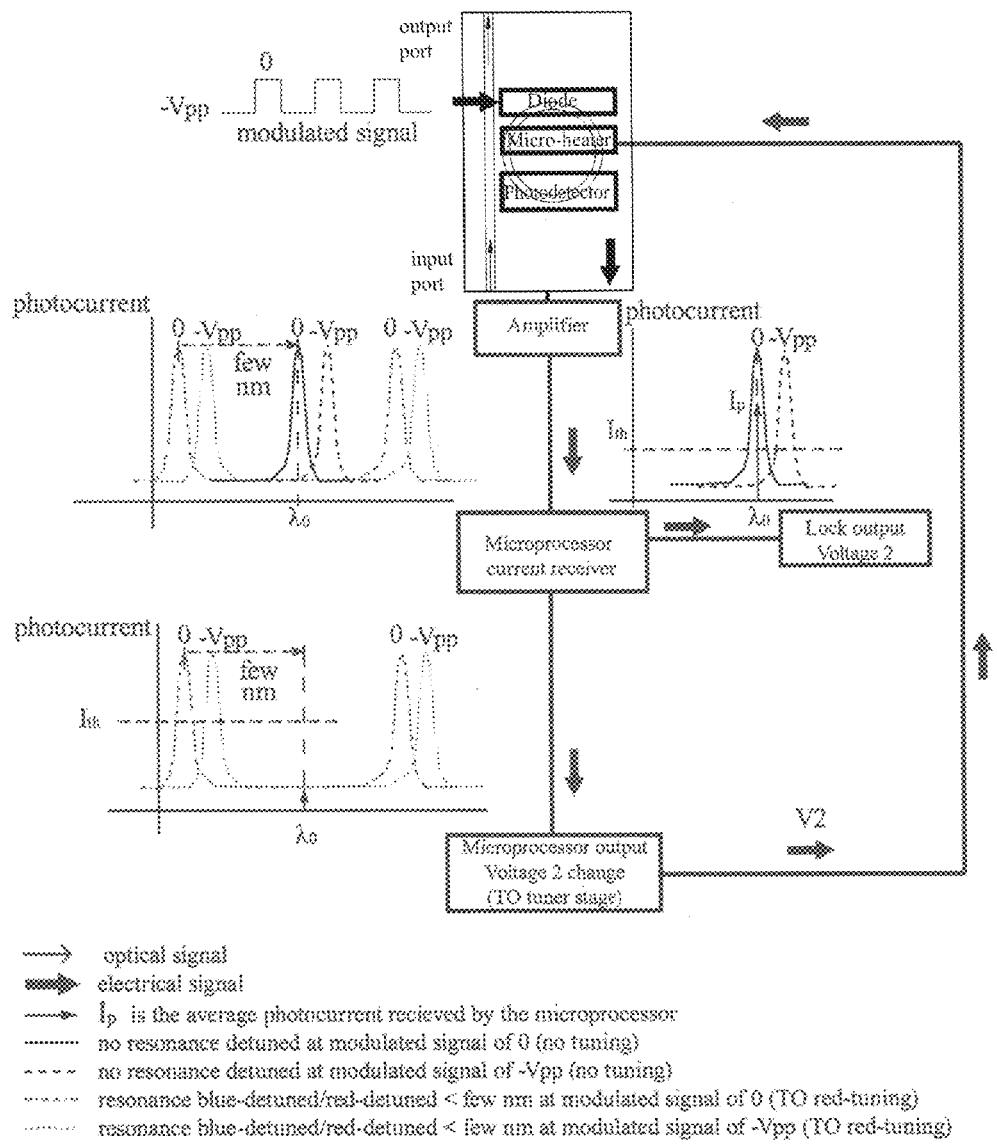
FIG. 5 is a diagram illustrating real-time monitoring and closed-loop tuning for a single microresonator-based electro-optical modulator in an embodiment.

FIG. 5 schematically shows another embodiment applied to a high-speed EO intensity modulator on a SOI substrate. A microresonator integrated with a P-I-N or PN photodetector, a micro-heater and a PN diode for EO carrier-depletion-based modulation is side-coupled to a single-mode bus waveguide. The modulator is basically a fast EO switch switching continuously between the on- and off-states at the signal wavelength $\lambda_o$. Here, the PN diode is driven by a radio-frequency (RF) electrical signal with a reverse-bias voltage swing of $-V_{pp}$. Thus, the real-time tuning scheme only employs the TO tuning. The monitoring requires the photodiode to continuously readout electrical signals as the modulator modulates. Only the time-average photocurrent between the high-(on-state) and low-level (off-state) photocurrents extracted from the modulator are monitored. The threshold photocurrent is set according to the time-average photocurrent value between the high- and low-level photocurrents. In the event that the microprocessor receives an $I_p<I_{th}$, the microprocessor voltage output-port V2 that controls the micro-heater is to be activated until $I_p>I_{th}$ is acquired. The output-port V2 voltage value is then locked.

Figure 6:
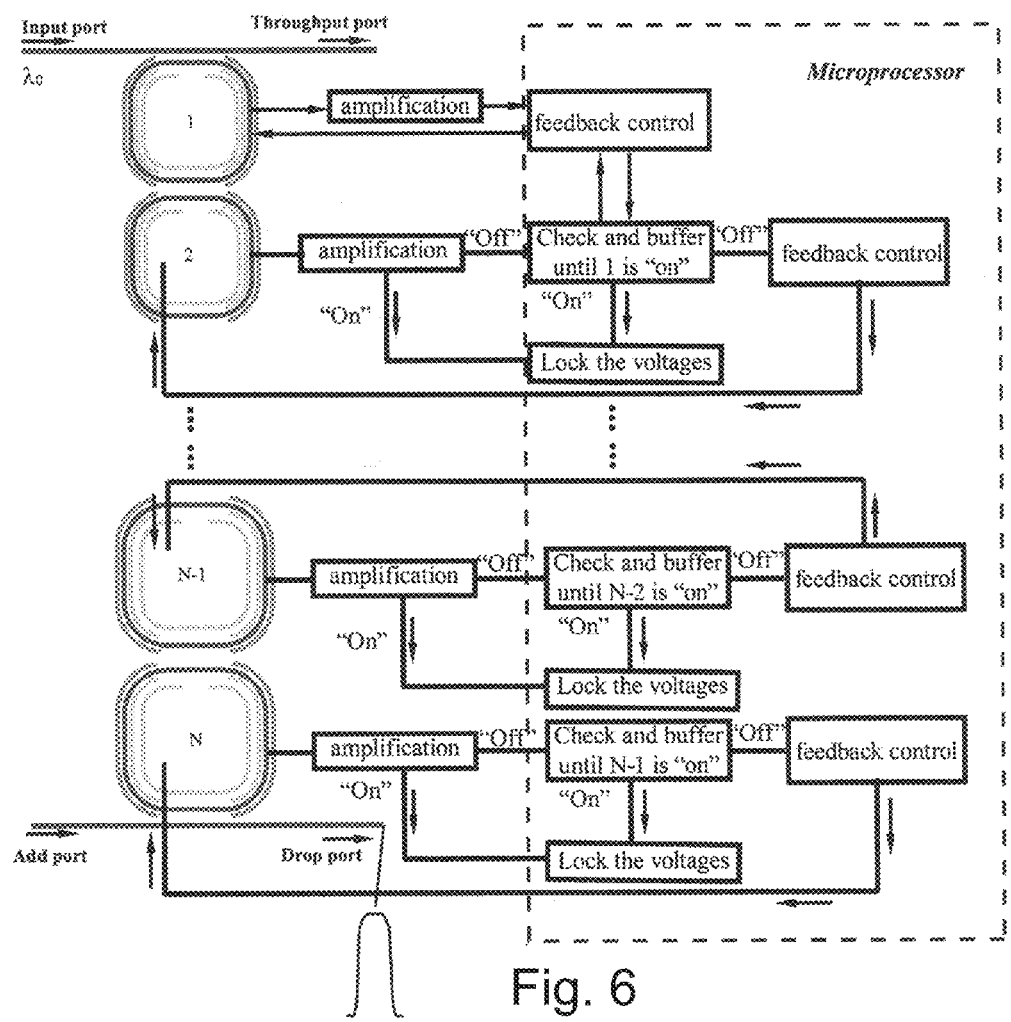
FIG. 6 is a diagram illustrating a serial-coupled high-order microresonator-based optical filter in an embodiment.

FIG. 6 schematically shows another embodiment of the invention applied to a high-order-coupled microresonator-based device. Such a device configuration is applicable as a high-order WDM channel filter, an optical delay line and a switch element. The microresonators with integrated P-I-N or PN photodetector and tuners are either identical in design or their sizes follow the Vernier effect design (i.e., the design is based on the Vernier effect—the total free spectral range (FSR) of two coupled microresonators with different lengths and thereby different FSRs is given by the lowest common factor of the different FSRs). The microresonators are serially coupled to each other and can result in a broadened transmission band. The microresonators are individually monitored and actively tuned by a single microprocessor. Due to the mode-field distributions along the serially coupled microresonators, each constituent microresonator can exhibit different cavity field enhancement at $\lambda_o$ within the transmission band. Thus, the $I_{th}$ for each microresonator can be set differently. The real-time monitoring and the active tuning mechanism of the first microring coupled to the input bus waveguide is the same as those in the single microring device.

However, starting from the second microresonator, once the photocurrent collected from the microresonator is below the specific $I_{th}$ set for the particular microresonator, the microprocessor is to first check the electrical readout of the prior microresonator. There are two scenarios. In scenario 1, the electrical signal of the prior microresonator is above its threshold. The microprocessor then follows the resonance control process illustrated above for the latter microresonator.

In scenario 2, the electrical signal of the prior microresonator also shows a sub-threshold photocurrent value. The microprocessor then first waits for the resonance correction of the prior microresonator. If the photocurrent receives from the latter microresonator exceeds its threshold after the correction, the voltage sources of the latter microresonator need no change. Otherwise, the scenario turns into scenario 1 for the latter microresonator. The monitoring and active tuning for the rest of the coupled microresonators follow the above procedure as illustrated above, namely before actively tuning the $N^{th}$ microresonator (N=2, 3, . . . ), the control circuit first checks the electrical readout of the $(N-1)^{th}$ microresonator. In the event that an "off" state is required for the device transmission, the microprocessor needs to check whether all the microresonators are at an "off" state.

Figure 7:
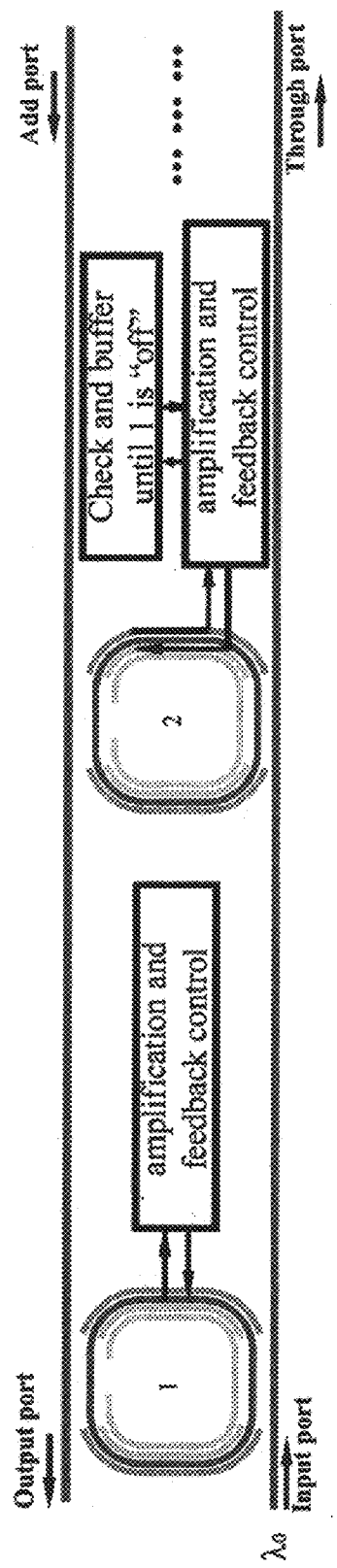
FIG. 7 is a diagram illustrating a parallel-coupled high-order microresonator-based optical filter in an embodiment.

FIG. 7 schematically shows another embodiment applied to side-coupled integrated spaced sequences of resonators (SCISSORs). Like the high-order-coupled microresonator configuration, such a device configuration is also applicable as a high-order WDM channel filter, an optical delay line and a switch element. The microresonators with integrated P-I-N or PN photodetector and tuners are either identical in design or their sizes follow the Vernier effect design. The microresonators are parallel coupled to each other via the bus waveguides. The microresonators are individually monitored and actively tuned by a single microprocessor. In the case of detecting a sub-threshold current for the $N^{th}$ coupled microring, the microprocessor is to first check the electrical readout of the $(N-1)^{th}$ coupled microring before tuning itself.

Figure 8:
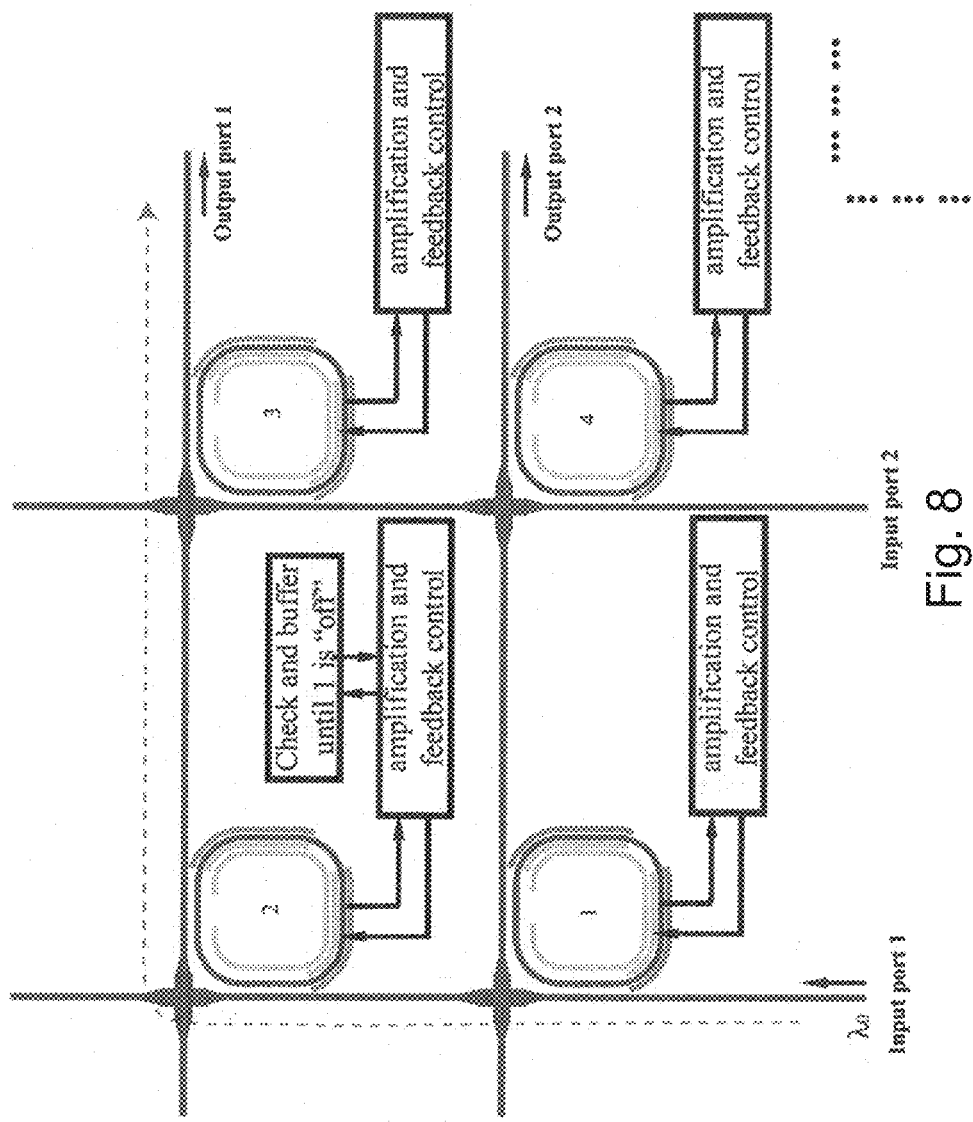
FIG. 8 is a diagram illustrating a single-channel N×M optical router in an embodiment.

FIG. 8 schematically shows another embodiment applied to a single-channel N×M optical router, where N represents the number of input-ports, and M represents the number of output-ports. The microresonator-based switch elements in the two-dimensional array are designed to be identical. Each microresonator-based switch element is monitored and actively tuned separately but controlled by a single microprocessor. In order to dynamically set up a route for signal wavelength $\lambda_o$, each microresonator switch element is assigned either the on- or off-state. For example, in the case of a 2×2 matrix switch, route 1 (indicated in dashed line in FIG. 8) requires switch elements 1, 2 and 3 to be "off," "on" and "off" at $\lambda_o$, respectively.

For microresonator 1, the monitoring and active tuning scheme is the same as that of a single microresonator. For microresonator 2, as an "on" state is required, once a sub-threshold $I_p$ is detected, before tuning itself, it is to first check and wait until the prior microresonator on the route, namely microresonator 1, is checked to be in its required state. For microresonator 3, as an "off" state is required, the monitoring and the active tuning scheme is the same as that of a single microresonator.

Figure 9:
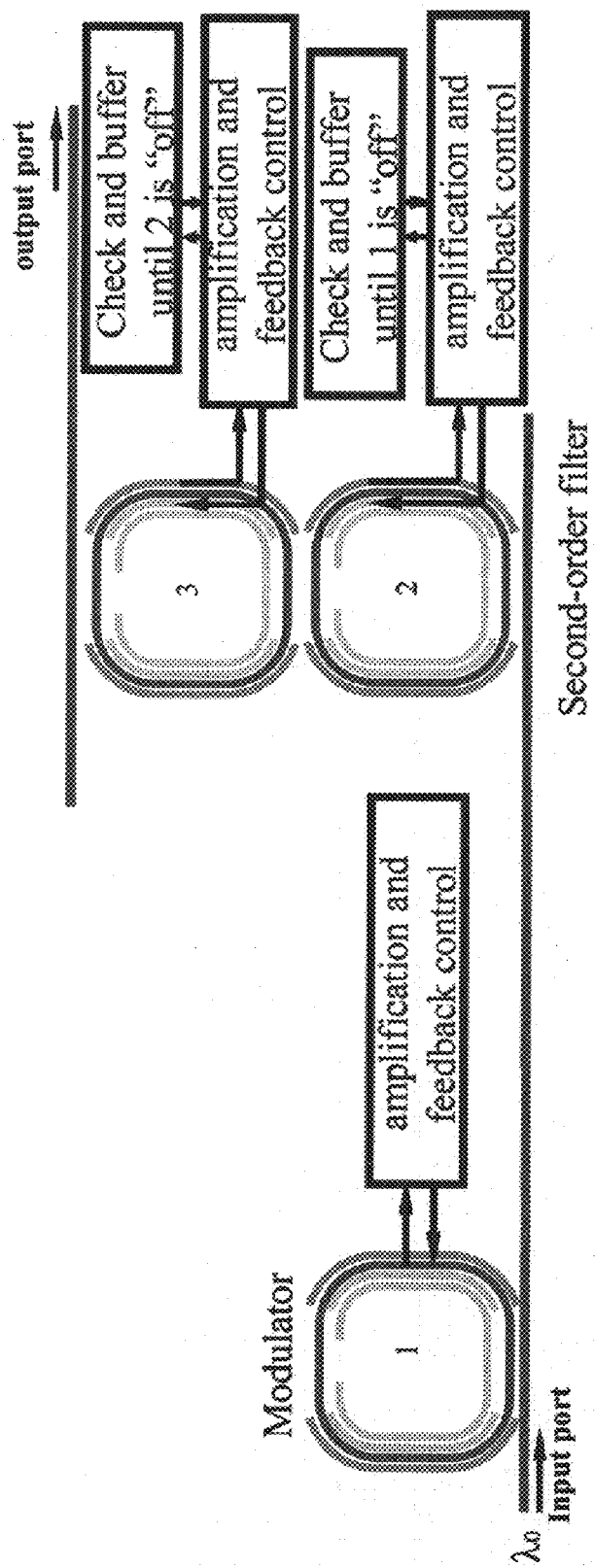
FIG. 9 is a diagram illustrating an integrated optical circuit in an embodiment.

FIG. 9 schematically shows another embodiment applied to a photonic integrated circuit (PIC) that comprises a microring resonator-based modulator and a second-order coupled-microring resonator-based filter, both designed to be operating at $\lambda_o$. There are numerous ways to construct a PIC and here we only use a simple circuit as an example embodiment of the invention. The real-time monitoring and the active tuning mechanism of the modulator and the filter are the same as illustrated above. The only difference between the PIC monitoring and the individual component monitoring is that, for example, in the case of detecting a sub-threshold $I_p$ for the first coupled microring of the filter, the microprocessor is to first check the electrical readout of the prior interconnected device, i.e. the modulator in this case.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The inention claimed is:

1. An integrated silicon optical device capable of being monitored and tuned in real-time, comprising:
   a bus waveguide, comprising an input port and an output port;
   an optical microresonator coupled to the bus waveguide, configured to selectively receive light at a desired resonance wavelength from the bus waveguide;
   a photodetector, configured to electrically read out an operation condition of the optical microresonator;
   a diode-tuner, configured to blueshift or redshift the resonance wavelength of the optical microresonator;
   a micro-heater, configured to redshift the resonance wavelength of the optical microresonator; and
   a control unit, comprising a transimpedance amplifier (TIA) and a microprocessor, configured to implement a two-stage closed-loop tuning scheme utilizing the diode-tuner and the micro-heater.

2. The integrated silicon optical device of claim 1, wherein the waveguide, the microresonator, the photodetector, the diode-tuner, and the micro-heater are fabricated on the same silicon-on-insulator (SOI) substrate.

3. The integrated silicon optical device of claim 1, wherein the operating wavelengths of the device is in the range of approximately 1300 nm to approximately 1600 nm.

4. The integrated silicon optical device of claim 1, wherein the integrated silicon optical device of claim 1 is configured to accept a signal received through the input port with a data rate that does not match a data rate of the control unit.

5. The integrated silicon optical device of claim 2, wherein the photodetector is a linear-absorption-based photodetector.

6. The integrated silicon optical device of claim 5, wherein the linear-absorption-based photodetector is configured for surface-state absorption at a surface or interface of the linear-absorption-based photodetector.

7. The integrated silicon optical device of claim 5, wherein the linear-absorption-based photodetector is configured for defect-state absorption in the bulk of a silicon waveguide part of the linear-absorption-based photodetector.

8. The integrated silicon optical device of claim 5, wherein the microresonator is ring-shaped, and wherein the linear-absorption-based photodetector is a PN diode integrated along a section of a microresonator circumference, where the P and N doped regions spatially overlap with an optical mode in the microresonator.

9. The integrated silicon optical device of claim 5, wherein the microresonator is ring-shaped, and wherein the linear-absorption-based photodetector is a P-I-N diode integrated along a section of a microresonator circumference, where the I region of the diode spatially overlaps with an optical mode in the microresonator, and the P and N doped regions are located outside the optical mode in the microresonator.

10. The integrated silicon optical device of claim 1, wherein photocurrent from the photodetector is amplified by the TIA.

11. The integrated silicon optical device of claim 1, wherein electrical signal from the TIA is an input signal to the two-stage closed-loop tuning scheme.

12. The integrated silicon optical device of claim 1, wherein the two-stage closed-loop tuning scheme comprises an electro-optical tuning stage and a thermal-optical tuning stage.

13. The integrated silicon optical device of claim 12, wherein, in the two-stage closed-loop tuning scheme, the electro-optical tuning stage is triggered first relative to the thermal-optical tuning stage.

14. The integrated silicon optical device of claim 13, wherein, in the two-stage closed-loop tuning scheme, the thermal-optical tuning stage is triggered after the electro-optical tuning stage reaches saturation.

15. The integrated silicon optical device of claim 1, wherein the diode-tuner is a P-I-N diode integrated along a section of the optical microresonator, where the I region of the diode spatially overlaps with an optical mode in the microresonator, and the P and N doped regions are located outside the optical mode in the microresonator.

16. The integrated silicon optical device of claim 15, wherein the diode-tuner is configured to utilize an electro-optical free-carrier plasma dispersion effect upon a forward bias voltage across the P-I-N diode.

17. The integrated silicon optical device of claim 1, wherein the diode-tuner is a PN diode integrated along a section of the optical microresonator, where the P and N doped regions spatially overlap with an optical mode in the microresonator.

18. The integrated silicon optical device of claim 17, wherein the diode-tuner is configured to utilize an electro-optical free-carrier plasma dispersion effect upon a reverse bias voltage across the PN diode.

19. The integrated silicon optical device of claim 17, wherein the diode-tuner is configured to utilize an electro-optical free-carrier plasma dispersion effect upon a forward bias voltage across the PN diode.

20. The integrated silicon optical device of claim 1, wherein the micro-heater is an integrated silicon resistor located to the inside of the microresonator or located to the outside of the microresonator.

21. The integrated silicon optical device of claim 1, wherein the micro-heater is a layer of metal resistor that is located on top of the microresonator.

22. The integrated silicon optical device of claim 1, wherein the micro-heater is configured to utilize a thermal-optical effect in silicon.

23. The integrated silicon optical device of claim 1, wherein the microresonator is a circular-shaped ring resonator.

24. The integrated silicon optical device of claim 1, wherein the microresonator is a non-circular-shaped ring resonator.

25. The integrated silicon optical device of claim 1, wherein the microresonator is a circular-shaped microdisk.

26. The integrated silicon optical device of claim 1, wherein the integrated silicon optical device is an electro-optical modulator.

27. The integrated silicon optical device of claim 1, wherein the integrated silicon optical device is part of a high-order coupled-microresonator-based optical device having multiple microresonators that are identical in design or have sizes that follow the Vernier effect design;
  wherein the multiple microresonators are serially-coupled to each other as a coupled resonator optical waveguide (CROW) or parallel-coupled to waveguides as side-coupled integrated spaced sequences of resonators (SCISSORs);
  wherein the multiple microresonators are monitored and tuned by the control unit; and
  wherein, in the two-stage closed-loop tuning scheme, triggering tuning for a particular microresonator is based on an operation condition for a microresonator coupled to the particular microresonator.

28. The integrated silicon optical device of claim 1, wherein the integrated silicon optical device is part of an optical integrated circuit comprising various kinds of optical devices with multiple microresonators;
  wherein the multiple microresonators are monitored and tuned by the control unit; and
  wherein, in the two-stage closed-loop tuning scheme, triggering tuning for a particular microresonator is based on an operation condition for a microresonator coupled to the particular microresonator.

29. An optical filter capable of being monitored and tuned in real-time, comprising:
  an input waveguide configured to carry optical signals in multiple wavelengths;
  an output waveguide;
  an optical microresonator coupled to the input and output waveguides to selectively transfer optical signals of at least one desired resonance wavelength from a plurality of optical signals of multiple wavelengths from the input waveguide to the output waveguide;
  a photodetector, configured to electrically read out an operation condition of the optical microresonator;
  a diode-tuner, configured to blueshift or redshift the resonance wavelength of the optical microresonator;
  a micro-heater, configured to redshift the resonance wavelength of the optical microresonator;

a control unit, comprising a transimpedance amplifier (TIA) and a microprocessor, configured to implement a two-stage closed-loop tuning scheme utilizing the diode-tuner and the micro-heater.

30. An electro-optical switch capable of being monitored and tuned in real-time, comprising:

a multimode-interference-based waveguide crossing with four ports, including an input port and an output port;

an optical microresonator coupled to the multimode-interference-based waveguide crossing to selectively transfer light at a desired resonance wavelength received from the input port to the output port;

a photodetector, configured to electrically read out an operation condition of the optical microresonator;

a diode-tuner, configured to blueshift or redshift the resonance wavelength of the optical microresonator;

a micro-heater, configured to redshift the resonance wavelength of the optical microresonator;

a control unit, comprising a transimpedance amplifier (TIA) and a microprocessor, configured to implement a two-stage closed-loop tuning scheme utilizing the diode-tuner and the micro-heater.

31. The electro-optical switch of claim 30, wherein the electro-optical switch is part of a two-dimensional array of identically designed cascaded electro-optical switches of an optical router, wherein the control unit is configured to perform real-time monitoring and tuning of all of the switching elements of the two-dimensional array, and wherein, in the two-stage closed-loop tuning scheme, triggering tuning for a particular microresonator is based on an operation condition for a prior-coupled microresonator in the two-dimensional array.

* * * * *